US012323940B2

(12) United States Patent
Zhu et al.

(10) Patent No.: US 12,323,940 B2
(45) Date of Patent: Jun. 3, 2025

(54) POSITIONING METHOD AND COMMUNICATIONS APPARATUS

(71) Applicant: Huawei Technologies Co., Ltd., Shenzhen (CN)

(72) Inventors: Haoren Zhu, Shanghai (CN); Hualin Zhu, Shanghai (CN)

(73) Assignee: HUAWEI TECHNOLOIES CO., LTD., Shenzhen (CN)

( * ) Notice: Subject to any disclaimer, the term of this patent is extended or adjusted under 35 U.S.C. 154(b) by 533 days.

(21) Appl. No.: 17/166,693

(22) Filed: Feb. 3, 2021

(65) Prior Publication Data

US 2021/0160811 A1 May 27, 2021

Related U.S. Application Data

(63) Continuation of application No. PCT/CN2019/100223, filed on Aug. 12, 2019.

(30) Foreign Application Priority Data

Aug. 13, 2018 (CN) .......................... 201810917815.4

(51) Int. Cl.
H04W 4/00 (2018.01)
H04W 8/08 (2009.01)
(Continued)

(52) U.S. Cl.
CPC ........... *H04W 64/00* (2013.01); *H04W 8/082* (2013.01); *H04W 84/042* (2013.01); *H04W 88/16* (2013.01)

(58) Field of Classification Search
CPC ... H04W 64/00; H04W 8/082; H04W 84/042; H04W 88/16; H04W 8/08; H04W 4/02
See application file for complete search history.

(56) References Cited

U.S. PATENT DOCUMENTS

2009/0253440 A1 10/2009 Edge
2011/0136500 A1 6/2011 Sung et al.
(Continued)

FOREIGN PATENT DOCUMENTS

CN 1691818 A 11/2005
CN 1914833 A 2/2007
(Continued)

OTHER PUBLICATIONS

3GPP TS 23.060 V15.3.0, "3rd Generation Partnership Project; Technical Specification Group Services and System Aspects; General Packet Radio Service (GPRS); Service description; Stage 2 (Release 15)," Jun. 2018, 367 pages.
(Continued)

*Primary Examiner* — Omoniyi Obayanju
(74) *Attorney, Agent, or Firm* — Conley Rose, P.C.

(57) ABSTRACT

A positioning method includes: receiving, by a mobile location center gateway, a first positioning request for positioning a terminal device from a location service client; determining, by the mobile location center gateway, a first target public land mobile network (PLMN) based on the first positioning request, where the first target PLMN is for providing a location service for the terminal device; and sending, by the mobile location center gateway, a second positioning request to a first location management function (LMF) in the first target PLMN, where the second positioning request requests the first LMF to provide a location service for the terminal device.

23 Claims, 24 Drawing Sheets

(51) Int. Cl.
*H04W 64/00* (2009.01)
*H04W 84/04* (2009.01)
*H04W 88/16* (2009.01)

(56) References Cited

U.S. PATENT DOCUMENTS

| | | | |
|---|---|---|---|
| 2013/0012166 A1 | 1/2013 | Li et al. | |
| 2014/0274059 A1 | 9/2014 | Ramle et al. | |
| 2017/0318414 A1 | 11/2017 | Kall et al. | |
| 2018/0199160 A1* | 7/2018 | Edge | H04W 4/029 |

FOREIGN PATENT DOCUMENTS

| | | | |
|---|---|---|---|
| CN | 101232700 A | 7/2008 | |
| CN | 101742432 A | 6/2010 | |
| CN | 102215449 A | 10/2011 | |
| CN | 104025654 A | 9/2014 | |
| CN | 107113562 A | 8/2017 | |
| RU | 2394392 C2 | 7/2010 | |
| RU | 2477022 C2 | 2/2013 | |
| WO | 2010048995 A1 | 5/2010 | |
| WO | 2014017965 A2 | 1/2014 | |
| WO | WO-2015013859 A1 * | 2/2015 | H04W 64/00 |

OTHER PUBLICATIONS

3GPP TS 23.167 V15.2.0 "3rd Generation Partnership Project; Technical Specification Group Services and System Aspects; IP Multimedia Subsystem (IMS) emergency sessions (Release 15)," Jun. 2018, 63 pages.

3GPP TS 23.234 V13.1.0 "3rd Generation Partnership Project; Technical Specification Group Services and System Aspects; 3GPP system to Wireless Local Area Network (WLAN) interworking; System description (Release 13)," Mar. 2017, 16 pages.

3GPP TS 23.271 V15.0.0 "3rd Generation Partnership Project; Technical Specification Group Services and System Aspects; Functional stage 2 description of Location Services (LCS) (Release 15)," Jun. 2018, 184 pages.

3GPP TS 23.401 V15.4.0 "3rd Generation Partnership Project; Technical Specification Group Services and System Aspects; General Packet Radio Service (GPRS) enhancements for Evolved Universal Terrestrial Radio Access Network (E-UTRAN) access (Release 15)," Jun. 2018, 410 pages.

3GPP TS 23.501 V15.2.0 "3rd Generation Partnership Project; Technical Specification Group Services and System Aspects; System Architecture for the 5G System; Stage 2 (Release 15)," Jun. 2018, 217 pages.

3GPP TS 23.502 V15.2.0 (Jun. 2018), "3rd Generation Partnership Project; Technical Specification Group Services and System Aspects; Procedures for the 5G System; Stage 2 (Release 15)," Jun. 2018, 308 pages.

3GPP TS 24.008 V15.3.0 "3rd Generation Partnership Project; Technical Specification Group Core Network and Terminals; Mobile radio interface Layer 3 specification; Core network protocols; Stage 3 (Release 15)," Jun. 2018, 788 pages.

3GPP TS 25.305 V15.0.0 "3rd Generation Partnership Project; Technical Specification Group Radio Access Network; Stage 2 functional specification of User Equipment (UE) positioning in UTRAN (Release 15)," Jun. 2018, 95 pages.

3GPP TS 36.305 V15.0.0 "3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 15)," Jul. 2018, 85 pages.

3GPP TS 36.355 V15.0.0 "3rd Generation Partnership Project; Technical Specification Group Radio Access Network; Evolved Universal Terrestrial Radio Access (E-UTAR); LTE Positioning Protocol (LPP) (Release 15)," Jun. 2018, 216 pages.

3GPP TS 38.455 V15.0.0 "3rd Generation Partnership Project; Technical Specification Group Radio Access Network; NG-RAN; NR Positioning Protocol A (NRPPa) (Release 15)," Jun. 2018, 60 pages.

3GPP TS 43.059 V15.1.0 "3rd Generation Partnership Project; Technical Specification Group Radio Access Network; Functional stage 2 description of Location Services (LCS) in GERAN (Release 15)," Jun. 2018, 83 pages.

ZTE, "Update LCS based solution," 3GPP TSG SA WG2 Meeting #83, TD S2-110503, Feb. 21-25, 2011, Salt Lake City, Utah, USA, 4 pages.

CATT, "New KI #X: Positioning Access selection for LCS service," SA WG2 Meeting #127, S2-183696, Apr. 16, 2018, Sanya, China, 1 page.

Qualcomm Incorporated, "Enhancements to Solution 2," SA WG2 Meeting #128, S2-187012, Jul. 2-6, 2018, Vilnius, Lithuania, 22 pages.

Qualcomm Incorporated, "Location Services for 5G System Procedures," 3GPP Draft; S2-170821, Feb. 7, 2017, XP051228112, 12 pages.

* cited by examiner

POSITIONING METHOD AND COMMUNICATIONS APPARATUS

CROSS-REFERENCE TO RELATED APPLICATIONS

This application is a continuation of International Patent Application No. PCT/CN2019/100223, filed on Aug. 12, 2019, which claims priority to Chinese Patent Application No. 201810917815.4, filed on Aug. 13, 2018. The disclosures of the aforementioned applications are hereby incorporated by reference in their entireties.

TECHNICAL FIELD

This application relates to the communications field, and more specifically, to a positioning method and a communications apparatus.

BACKGROUND

Positioning procedures applicable to different scenarios are defined in a 5th generation (5G) mobile communications technology standard and include a network induced location request (NI-LR) procedure, a mobile terminated location request (MT-LR) procedure, a mobile originated location request (MO-LR) procedure, and the like.

A currently involved positioning procedure is mainly for a positioning technology used when a terminal device accesses only one public land mobile network (PLMN). In the procedure, the terminal device may access the PLMN using a 3rd Generation Partnership Project (3GPP) technology, or may access the PLMN using a non-3GPP technology. However, currently, a positioning technology used when the terminal device accesses a plurality of PLMN networks is not perfect. Therefore, a positioning problem when the terminal device accesses the plurality of PLMN networks becomes an urgent problem that needs to be currently resolved.

SUMMARY

This application provides a positioning method and a communications apparatus, to implement positioning of a terminal device in a multi-PLMN scenario. This improves efficiency and accuracy of terminal device positioning, and improves communication efficiency and user experience.

According to a first aspect, a positioning method is provided. The method includes: receiving, by a mobile location center gateway, a first positioning request for positioning a terminal device from a location service client; determining, by the mobile location center gateway, a first target PLMN based on the first positioning request, where the first target PLMN is for providing a location service for the terminal device; and sending, by the mobile location center gateway, a second positioning request to a first location management network element such as a first local management function (LMF) in the first target PLMN, where the second positioning request requests the first LMF to provide a location service for the terminal device.

According to the positioning method provided in the first aspect, the terminal device can be positioned in a scenario in which the terminal device accesses a plurality of PLMNs. This clarifies a terminal device positioning technology in the multi-PLMN scenario, improves efficiency and accuracy of terminal device positioning, and improves communication efficiency and user experience.

In a possible implementation of the first aspect, the determining, by the mobile location center gateway, a first target PLMN based on the first positioning request includes: determining, by the mobile location center gateway based on the first positioning request, a plurality of PLMNs that the terminal device accesses; and determining, by the mobile location center gateway, the first target PLMN in the plurality of PLMNs.

In a possible implementation of the first aspect, the determining, by the mobile location center gateway, the first target PLMN in the plurality of PLMNs includes: determining, by the mobile location center gateway, the first target PLMN in the plurality of PLMNs based on one or more of configuration information of the terminal device, information about an access technology type of the terminal device, and information about a connection status corresponding to the access technology type of the terminal device. The configuration information includes one or more of priority configuration information of the access technology type, priority configuration information of the connection status corresponding to the access technology type, or priority configuration information of the plurality of PLMNs. In the implementation, accuracy and efficiency of determining the first target PLMN can be improved, and the first target PLMN can be determined more quickly and accurately. In this way, communication resources are reduced, positioning time is reduced, and user experience is further improved. In the implementation, when a positioning result from the first LMF is inaccurate, a positioning result from a second LMF may be obtained, such that a positioning result of the terminal device is more accurate, and positioning precision and accuracy are improved.

In a possible implementation of the first aspect, the method further includes: receiving, by the mobile location center gateway, a first positioning result of the terminal device from the first LMF; sending, by the mobile location center gateway, a third positioning request to a second LMF in a second target PLMN when the first positioning result does not meet a positioning requirement, where the third positioning request requests the second LMF in the second target PLMN to provide a location service for the terminal device; and receiving, by the mobile location center gateway, a second positioning result of the terminal device from the second LMF.

In a possible implementation of the first aspect, the method further includes: determining, by the mobile location center gateway, a target positioning result of the terminal device based on the first positioning result and the second positioning result; and sending, by the mobile location center gateway, the target positioning result to the location service client. In the implementation, a target positioning result with better precision is determined in the positioning result from the first LMF and the positioning result from the second LMF. Alternatively, a target positioning result with best precision may be determined in positioning results determined by more LMFs, such that the positioning result is more accurate, and positioning precision is improved.

In a possible implementation of the first aspect, the determining, by the mobile location center gateway, a first target PLMN based on the first positioning request includes: determining, by the mobile location center gateway based on the first positioning request, a plurality of PLMNs that the terminal device accesses; and sending, by the mobile location center gateway, first instruction information to LMFs in the plurality of PLMNs, where the first instruction information is used to instruct the LMFs in the plurality of PLMNs to determine a positioning method; receiving, by the mobile location center gateway, the positioning method from the LMFs in the plurality of PLMNs; and determining, by the mobile location center gateway, the first target PLMN based on the received positioning method. In the implementation, accuracy and efficiency of determining the first target PLMN can be improved, and the first target PLMN can be determined more quickly and accurately. In this way, communication resources are reduced, positioning time is reduced, and user experience is further improved.

In a possible implementation of the first aspect, the determining, by the mobile location center gateway, the first target PLMN based on the received positioning method includes: determining, by the mobile location center gateway, a first positioning method based on positioning precision of the positioning method; and determining, by the mobile location center gateway, the first target PLMN based on the first positioning method.

In a possible implementation of the first aspect, the determining, by the mobile location center gateway based on the first positioning request, a plurality of PLMNs that the terminal device accesses includes: determining, by the mobile location center gateway based on a quantity of addresses of a serving LMF of the terminal device, a quantity of addresses of a serving access and mobility management function (AMF) of the terminal device, or a quantity of addresses of a serving gateway mobile location center (GMLC) of the terminal device, the plurality of PLMNs that the terminal device accesses.

In a possible implementation of the first aspect, the method further includes: receiving, by the mobile location center gateway, at least one of address information of the serving AMF, address information of the serving LMF, or address information of the serving GMLC from a unified management network element, where the terminal device accesses the serving AMF, the serving LMF and the serving GMLC.

In a possible implementation of the first aspect, the method further includes: receiving, by the mobile location center gateway, the information about the access technology type and/or the information about the connection status corresponding to the access technology type of the terminal device from the unified management network element.

In a possible implementation of the first aspect, the mobile location center gateway is a GMLC of a home public land mobile network (HPLMN) of the terminal device, and the first target PLMN is a visited public land mobile network (VPLMN) of the terminal device, or the first target PLMN is a HPLMN of the terminal device.

In a possible implementation of the first aspect, the second positioning request further includes at least one of the information about the access technology type corresponding to the first target PLMN, the information about the connection status corresponding to the access technology type, or the configuration information.

In any possible implementation of the first aspect, the first positioning request includes an identifier of the terminal device. The determining, by the mobile location center gateway, a first PLMN based on the first positioning request may be determining the first target PLMN using the identifier of the terminal device. For example, the mobile location center gateway obtains, from the unified data management network element using the identifier of the terminal device, at least one of the address information of the serving AMF, the address information of the serving LMF, or the address information of the serving GMLC, where the terminal device accesses the serving AMF, the serving LMF and the serving GMLC. The mobile location center gateway determines the first target PLMN based on at least one of the obtained address information of the serving AMF, address information of the serving LMF, or address information of the serving GMLC.

According to a second aspect, a positioning method is provided. The method includes: receiving, by an LMF, a second positioning request from a GMLC, where the LMF is configured to provide a location service for a terminal device; and determining, by the LMF, a positioning method based on the second positioning request.

According to the positioning method provided in the second aspect, the terminal device can be positioned in a multi-PLMN scenario. This improves efficiency and accuracy of terminal device positioning, and improves communication efficiency and user experience.

In a possible implementation of the second aspect, the method further includes: sending, by the LMF, the positioning method to the GMLC; and receiving, by the LMF, second instruction information from the GMLC, where the second instruction information is used to instruct the LMF to perform the positioning method or not to perform the positioning method.

In a possible implementation of the second aspect, when the second instruction information instructs the LMF to perform the positioning method, the method further includes: determining, by the LMF, a positioning result of the terminal device based on the positioning method; and sending, by the LMF, the positioning result to the GMLC.

In a possible implementation of the second aspect, the second positioning request further includes configuration information of the terminal device, and the determining, by the LMF, a positioning method based on the second positioning request includes: determining, by the LMF, an access technology type of the terminal device based on the configuration information and information about the access technology type; and determining, by the LMF, the positioning method based on the access technology type.

In a possible implementation of the second aspect, the second positioning request further includes the access technology type of the terminal device, and the determining, by the LMF, a positioning method based on the second positioning request includes: determining, by the LMF, the positioning method based on the access technology type.

In a possible implementation of the second aspect, the second positioning request further includes third instruction information, and the third instruction information is used to instruct the LMF to determine the positioning method based on the access technology type.

In a possible implementation of the second aspect, the second positioning request further includes information about a connection status and/or the information about the access technology type of the terminal device.

According to a third aspect, a positioning method is provided. The method includes: receiving, by a mobile location center gateway, a fourth positioning request for positioning a terminal device from a location service client; determining, by the mobile location center gateway, a first access technology type of the terminal device based on the fourth positioning request; and sending, by the mobile location center gateway based on the first access type, a fifth positioning request to a first LMF corresponding to the first access type, where the fifth positioning request requests the first LMF to provide a location service for the terminal device.

According to the positioning method provided in the third aspect, in a scenario in which the terminal device accesses a plurality of LMFs, an LMF that provides a service for the terminal device may be determined based on the access technology type, such that the terminal device can be positioned in an LMF scenario. This clarifies a terminal device positioning technology in the multi-LMF scenario, and improves communication efficiency and user experience.

In a possible implementation of the third aspect, the determining, by the mobile location center gateway, a first access technology type of the terminal device includes: determining, by the mobile location center gateway, the first access technology type based on configuration information of the terminal device, information about an access technology type of the terminal device, and information about a connection status corresponding to the access technology type of the terminal device. The configuration information includes one or more of priority configuration information of the access technology type, priority configuration information of the connection status corresponding to the access technology type, or priority configuration information of a plurality of PLMNs.

In a possible implementation of the third aspect, the method further includes: receiving, by the mobile location center gateway, a first positioning result of the terminal device from the first LMF; sending, by the mobile location center gateway based on a second access type, a fifth positioning request to a second LMF corresponding to the second access type when the first positioning result does not meet a positioning requirement, where the fifth positioning request requests the second LMF to provide a location service for the terminal device; and receiving, by the mobile location center gateway, a second positioning result of the terminal device from the second LMF.

In a possible implementation of the third aspect, the method further includes: determining, by the mobile location center gateway, a target positioning result of the terminal device based on the first positioning result and the second positioning result; and sending, by the mobile location center gateway, the target positioning result to the location service client.

In a possible implementation of the third aspect, the method further includes: receiving, by the mobile location center gateway, at least one of address information of a serving AMF, address information of a serving LMF, or address information of a serving GMLC from a unified management network element, where the terminal device accesses the serving AMF, the serving LMF and the serving GMLC.

In a possible implementation of the third aspect, the method further includes: receiving, by the mobile location center gateway, at least one of the configuration information, the information about the access technology type, or the information about the connection status corresponding to the access technology type that are from the unified management network element.

In any possible implementation of the third aspect, the fourth positioning request includes an identifier of the terminal device. The determining, by the mobile location center gateway, a first access technology type of the terminal device based on the fourth positioning request may be determining, by the mobile location center gateway, the first access technology type of the terminal device based on the identifier of the terminal device. For example, the mobile location center gateway obtains, from the unified data management network element based on the identifier of the terminal device, at least one of the configuration information, the information about the access technology type of the terminal device, or the information about the connection status corresponding to the access technology type of the terminal device. The mobile location center gateway determines the first access technology type of the terminal device based on at least one of the obtained configuration information, information about the access technology type of the terminal device, or information about the connection status corresponding to the access technology type of the terminal device.

According to a fourth aspect, a communications apparatus is provided. The apparatus includes a processor, a memory, and a transceiver that are configured to support the communications apparatus in performing corresponding functions in the foregoing methods. The processor, the memory, and the transceiver are connected through a communication bus. The memory stores an instruction. The transceiver is configured to send or receive a specific signal as driven by the processor. The processor is configured to invoke the instruction to implement the positioning method in the first aspect and the various implementations of the first aspect.

According to a fifth aspect, a communications apparatus is provided. The apparatus includes a processing module, a storage module, and a transceiver module that are configured to support the communications apparatus in performing a function of the mobile location center gateway in the first aspect or any possible implementation of the first aspect. The function may be implemented by hardware, or may be implemented by hardware by executing corresponding software, and the hardware or the software includes one or more modules corresponding to the foregoing function.

According to a sixth aspect, a communications apparatus is provided. The apparatus includes a processor, a memory, and a transceiver that are configured to support the communications apparatus in performing corresponding functions in the foregoing methods. The processor, the memory, and the transceiver are connected through communication. The transceiver is configured to send or receive a specific signal as driven by the processor. The processor is configured to invoke the instruction to implement the positioning method in the second aspect and the various implementations of the second aspect.

According to a seventh aspect, a communications apparatus is provided. The apparatus includes a processing module, a storage module, and a transceiver module that are configured to support the communications apparatus in performing a function of the location management gateway in the second aspect or any possible implementation of the second aspect. The function may be implemented by hardware, or may be implemented by hardware by executing corresponding software, and the hardware or the software includes one or more modules corresponding to the foregoing function.

According to an eighth aspect, a communications apparatus is provided. The apparatus includes a processor, a memory, and a transceiver that are configured to support the communications apparatus in performing corresponding functions in the foregoing methods. The processor, the memory, and the transceiver are connected through communication. The memory stores an instruction. The transceiver is configured to send or receive a specific signal as driven by the processor. The processor is configured to invoke the instruction to implement the positioning method in the third aspect and the various implementations of the third aspect.

According to a ninth aspect, a communications apparatus is provided. The apparatus includes a processing module, a storage module, and a transceiver module that are configured to support the communications apparatus in performing a function of the mobile location center gateway in the third aspect or any possible implementation of the third aspect. The function may be implemented by hardware, or may be implemented by hardware by executing corresponding software, and the hardware or the software includes one or more modules corresponding to the foregoing function.

According to a tenth aspect, an apparatus is provided. The apparatus can perform the positioning method according to any one of the foregoing embodiments. In the apparatus provided in the embodiments of this application, in a scenario in which the terminal device accesses a plurality of PLMNs, the terminal device can be positioned in a multi-PLMN scenario. This clarifies a terminal device positioning technology in the multi-PLMN scenario, improves efficiency and accuracy of terminal device positioning, and improves communication efficiency and user experience.

According to an eleventh aspect, a computer program product is provided. The computer program product includes computer program code. When the computer program code is run on a computer, the computer is enabled to perform the methods in the foregoing aspects.

According to a twelfth aspect, a computer-readable medium is provided. The computer-readable medium stores program code. When the computer program code is run on a computer, the computer is enabled to perform the methods in the foregoing aspects.

According to a thirteenth aspect, a chip system is provided. The chip system includes a processor, configured to implement, using a communications apparatus, functions in the foregoing aspects, for example, generating, receiving, sending, or processing data and/or information in the foregoing methods. In a possible design, the chip system further includes a memory, and the memory is configured to store a program instruction and data that are necessary for the communications apparatus. The chip system may include a chip, or may include a chip and another discrete device.

DESCRIPTION OF EMBODIMENTS

The following describes the technical solutions in this application with reference to the accompanying drawings.

Figure 1:
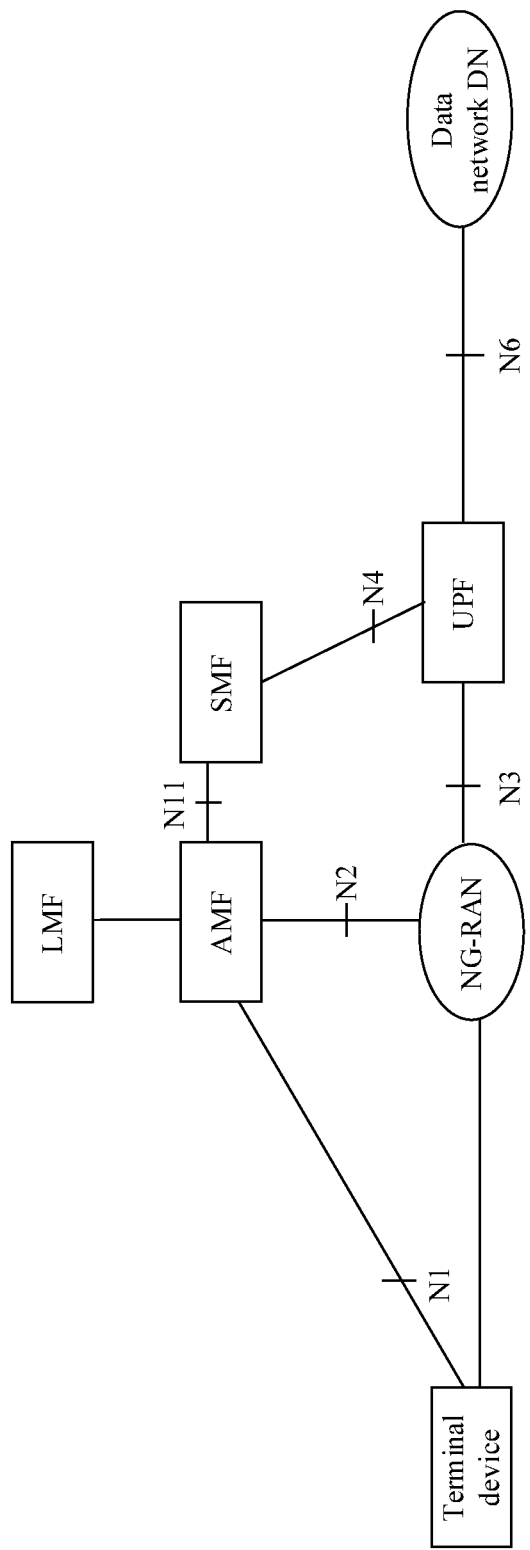
FIG. 1 is a schematic architecture diagram of a 5G communications system according to this application.

FIG. 1 is a schematic architecture diagram of a 5G communications system according to this application. As shown in FIG. 1, the communications system includes a terminal device, a next-generation radio access network (NG-RAN) access node, an access and mobility management function (AMF) network element, a location management function (LMF) network element, a session management function (SMF) network element, and a user plane function (UPF) network element. It should be understood that the system may further include another network element, but the other network element is not shown herein. The following describes the network elements listed above.

Terminal device: The terminal device may be a user equipment (UE), a handheld terminal, a notebook computer, a subscriber unit, a cellular phone, a smartphone, a wireless data card, a personal digital assistant (PDA) computer, a tablet computer, a wireless modem, a handheld device, a laptop computer, a cordless phone, a wireless local loop (WLL) station, a machine type communication (MTC) terminal, or another device that can access a network.

Next-generation radio access network (NG-RAN) access node: The NG-RAN access node is an access network device and is mainly responsible for functions on an air interface side, such as radio resource management, quality of service (QoS) management, and data compression and encryption. The access network device may include various forms of base stations, for example, a macro base station, a micro base station (also referred to as a small cell), a relay station, and an access point. In systems using different radio access technologies, a device having a base station function may have different names. For example, in a 5th-generation (5G) system, the device is referred to as a gNB; in a Long-Term Evolution (LTE) system, the device is referred to as an evolved NodeB (eNB or eNodeB); and in a 3rd-generation (3G) system, the device is referred to as a NodeB.

Access and mobility management function (AMF) network element: The access and mobility management function network element is a core network element, and is mainly responsible for signaling processing, for example, functions such as access control, mobility management, attachment and detachment, and gateway selection. When providing a service for a session in the terminal device, the AMF network element provides a control plane storage resource for the session, to store a session identifier, an SMF network element identifier associated with the session identifier, and the like.

Location management function (LMF) network element: The location management network element is configured to select a corresponding positioning method and select a corresponding communication protocol based on a positioning precision requirement, a delay requirement, and the like, to complete exchange of information required for positioning. The LMF is further configured to provide a location service with other required information or a positioning policy.

Session management function (SMF) network element: The session management function network element is responsible for user plane network element selection, user plane network element redirection, Internet Protocol (IP) address assignment, bearer establishment, modification, and release, and quality of service (QoS) control.

User plane function (UPF) network element: The user plane function network element is responsible for forwarding and receiving of user data in the terminal device, and may receive user data from a data network, and transmit the user data to the terminal device using the access network device. The UPF network element may further receive the user data from the terminal device using the access network device, and forward the user data to the data network. A transmission resource and a scheduling function in the UPF network element that provide a service for the terminal device are managed and controlled by the SMF network element.

It should be understood that, in the communications system shown in FIG. 1, functions and interfaces (for example, N1, N2, N3, N4, N6, and N11) of the network elements are merely examples. When the network elements are applied to the embodiments of this application, not all functions are necessary. All or some network elements of the core network may be physical network elements, or may be virtualized network elements. This is not limited herein.

Figure 2:
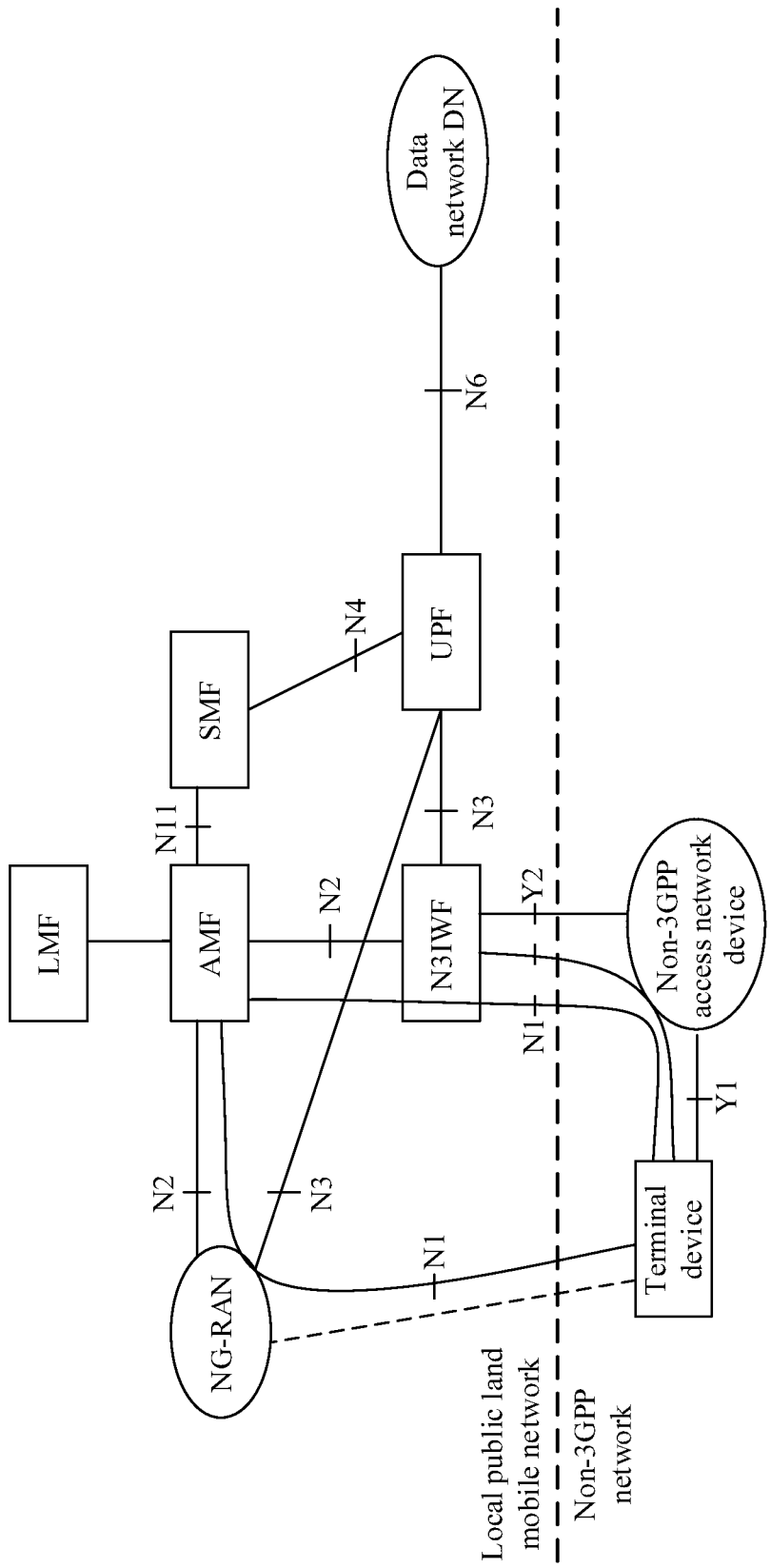
FIG. 2 is a schematic architecture diagram of another 5G communications system according to this application.

FIG. 2 is a schematic architecture diagram of a 5G wireless communications system according to this application. In the communications system, a terminal device accesses a core network using a 3GPP access technology and a non-3GPP access technology. As shown in FIG. 2, the communications system includes a terminal device, an NG-RAN, a non-3GPP access network device, a non-3GPP interworking function (N3 IWF) network element, an AMF, an LMF, an SMF, and a UPF, and may further include another network element, but the other network element is not shown herein. In addition, N1, N2, N3, N4, N6, N11, Y1, and Y2 are all used to represent different message types. A difference from the architecture of the 3GPP wireless communications system shown in FIG. 1 lies in that a non-3GPP access network device and a non-3GPP interworking function are added. The following mainly describes functions of the two network elements. For other network elements, refer to descriptions in FIG. 1.

Non-3GPP access network (N3GPP) device: This network element allows interconnection and interworking between the terminal device and the 3GPP core network using a non-3GPP technology. The non-3GPP technology is, for example, Wi-Fi, and a worldwide interoperability for microwave access (WiMAX) network. A local public land mobile network shown in FIG. 2 may be a home public land mobile network of the terminal device, that is, a public land mobile network with which the terminal device is first registered. The non-3GPP access network device shown in FIG. 2 may be an untrusted non-3GPP access network device. Compared with a trusted non-3GPP access network device that can directly access the 3GPP core network, the untrusted non-3GPP access network device needs to interconnect and interwork with the 3GPP core network using a security tunnel established by a security gateway. The security gateway is, for example, an evolved packet data gateway (ePDG) or a non-3GPP interworking function (N3IWF) network element.

N3IWF network element: This network element is a security gateway between an untrusted non-3GPP access network device and a 3GPP core network.

It should be understood that, in the communications system shown in FIG. 2, functions and interfaces (for example, N1, N2, N3, N4, N6, N11, Y1, and Y2) of the network elements are merely examples. When the network elements are applied to the embodiments of this application, not all functions are necessary. All or some network elements of the core network may be physical network elements, or may be virtualized network elements. This is not limited herein.

In other approaches, an involved positioning procedure is a positioning technology used when the terminal device accesses only one PLMN. The terminal device may access the PLMN using a 3GPP technology, or may access the PLMN using a non-3GPP technology. However, a positioning technology used when the terminal device accesses a plurality of PLMN networks is not perfect. Therefore, a positioning problem when the terminal device accesses the plurality of PLMN networks becomes an urgent problem that needs to be currently resolved.

Figure 3:
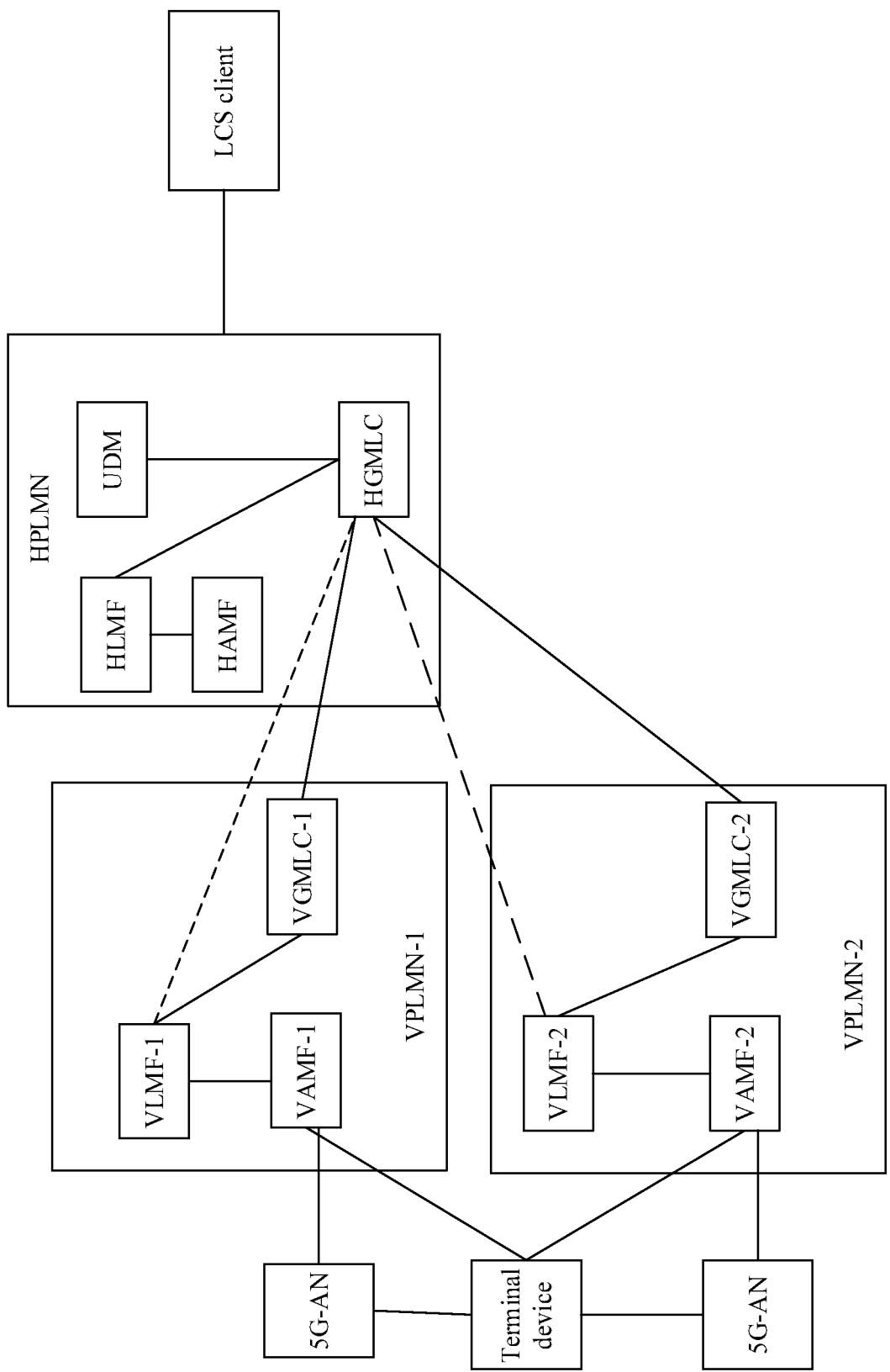
FIG. 3 is a schematic architecture diagram of a mobile communications system applicable to an embodiment of this application.

FIG. 3 is a schematic architecture diagram of a mobile communications system applicable to an embodiment of this application. As shown in FIG. 3, a terminal device accesses different PLMNs using a 3GPP technology or a non-3GPP technology. To be more specific, a 5G access network (5G-AN) in FIG. 3 may be a 3GPP access device or a non-3GPP access device. The network architecture shown in FIG. 3 includes three PLMNs. The network architecture includes one home PLMN (HPLMN) and two visited PLMNs (VPLMNs). Each PLMN includes an AMF, an LMF, a unified data management (UDM) gateway, and a mobile location center (gateway mobile location center (GMLC)) gateway. For example, for an HPLMN, an AMF, an LMF, and a GMLC may be respectively referred to as a home AMF (HAMF), a home LMF (HLMF), and a home GMLC (HGMLC). For a VPLMN, an AMF, an LMF, and a GMLC may be respectively referred to as a visited AMF (VAMF), a visited LMF (VLMF), and a visited GMLC (VGMLC). The network elements are connected using corresponding interfaces. The GMLC is a gateway node of an external location system (LCS) client (for example, an application server that needs to be positioned). For example, after the terminal device roams to another city or area, there may be a plurality of VPLMNs that provide a service for the terminal device. The plurality of VPLMNs may include the HPLMN, or may not include the HPLMN. In a scenario in which there are the plurality of VPLMNs, the HGMLC in the HPLMN first checks a privacy setting of a target UE (based on an external user equipment (UE) identifier), and then queries the UDM in the HPLMN for routing information (for example, an address of the VGMLC, an address of a visited AMF (VAMF), or an address of a visited LMF (VLMF)). Finally, the LCS client positioning request is forwarded to the VGMLC, the VAMF, or the VLMF.

Figure 4:
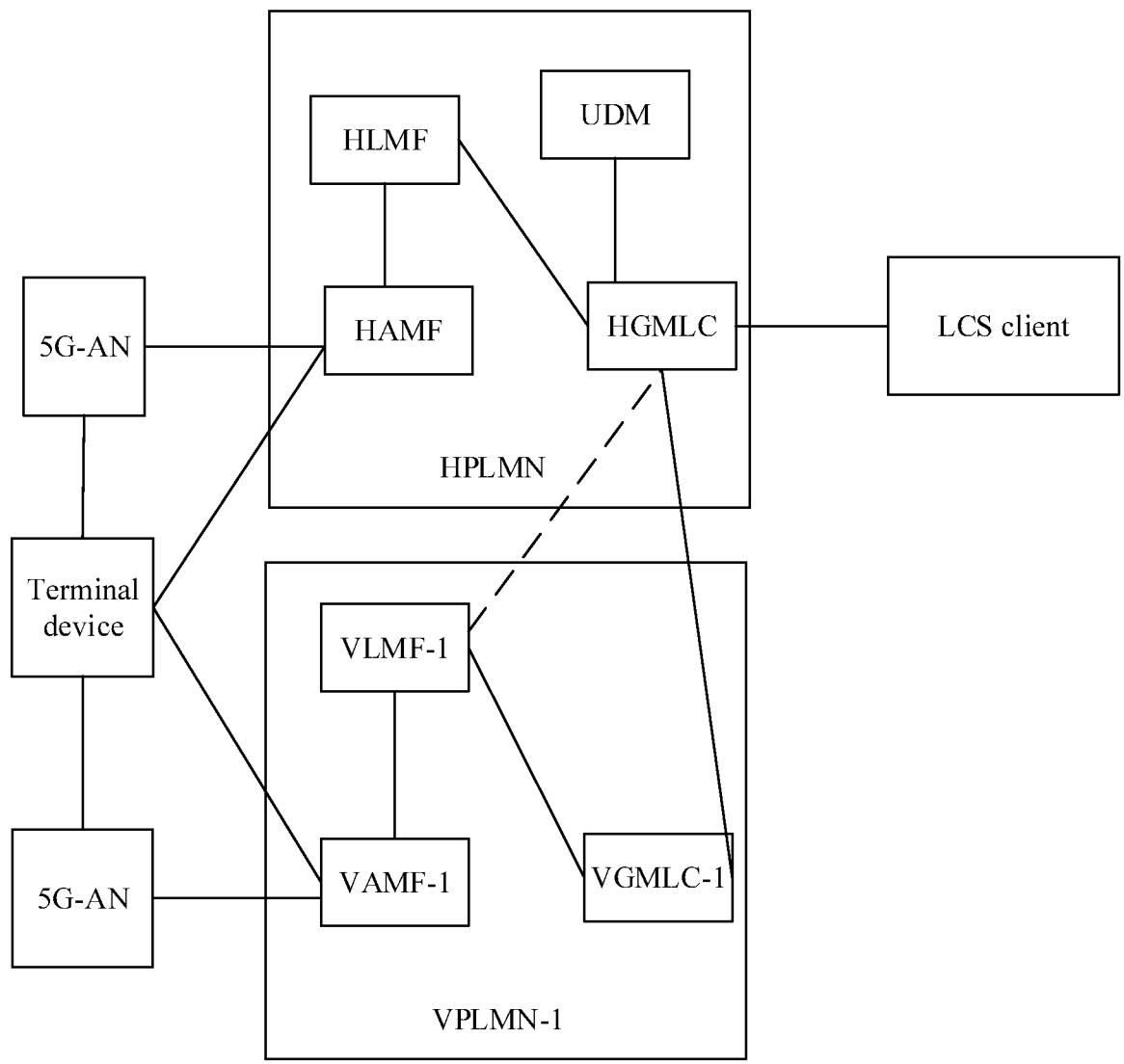
FIG. 4 is a schematic architecture diagram of another mobile communications system applicable to an embodiment of this application.

FIG. 4 is a schematic architecture diagram of another mobile communications system applicable to an embodiment of this application. As shown in FIG. 4, a terminal device accesses different PLMNs using a 3GPP technology or a non-3GPP technology. In other words, a 5G-AN in FIG. 4 may be a 3GPP access device or a non-3GPP access device. In a network architecture shown in FIG. 4, two PLMNs, namely, two serving PLMNs, serve the terminal device. Different from that in FIG. 3, in FIG. 4, the two serving PLMNs include one VPLMN-1 and one HPLMN. In other words, the serving PLMNs include an HPLMN and a VPLMN.

It should be understood that, with development of access technologies, the terminal device can access more PLMNs, and a quantity of PLMNs that the terminal device accesses is not limited in an architecture in FIG. 3 or FIG. 4.

Figure 5:
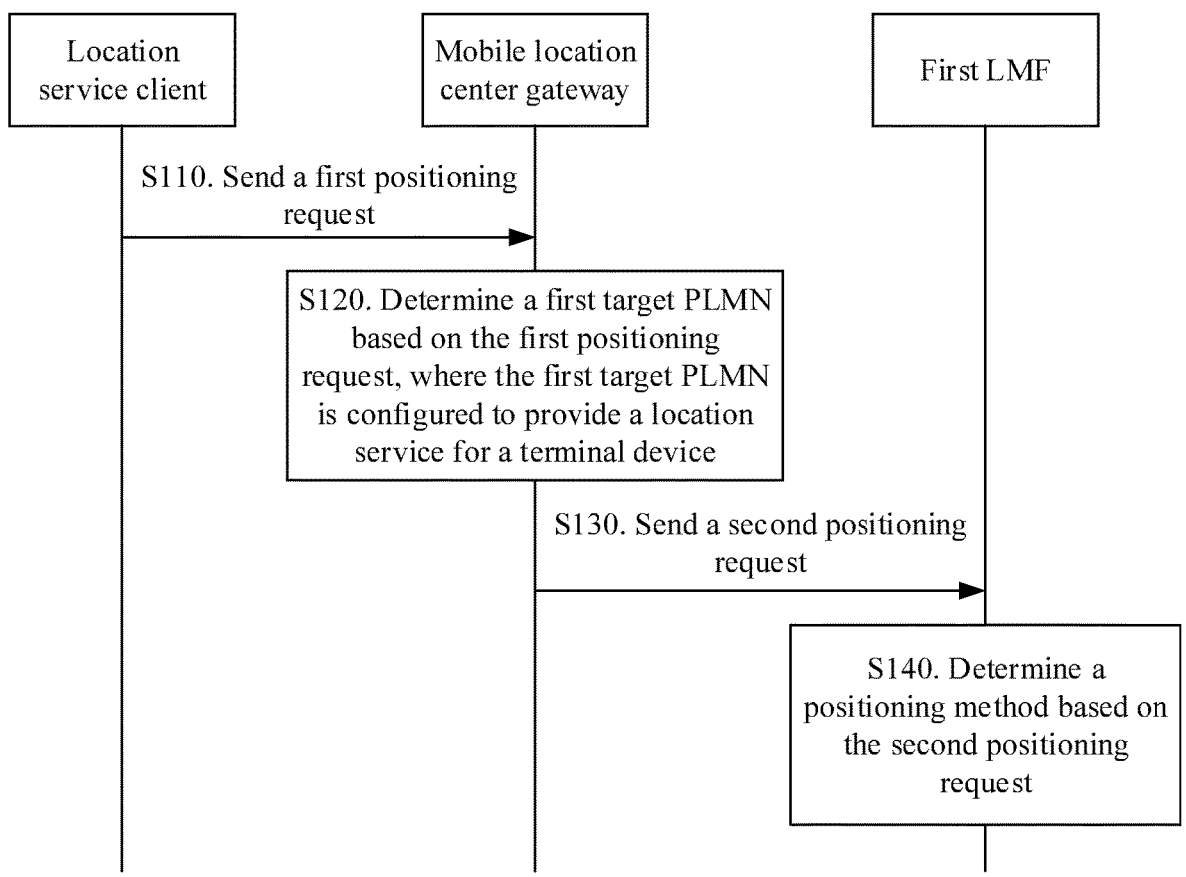
FIG. 5 is a schematic interaction diagram of a positioning method according to an embodiment of this application.

The following describes, with reference to FIG. 5, a positioning method provided in this application. FIG. 5 is a schematic interaction diagram of a positioning method 100 according to an embodiment of this application. The method 100 may be applied to the scenario shown in FIG. 3 or FIG. 4, and certainly may be applied to another communication scenario. This is not limited in this embodiment of this application.

As shown in FIG. 5, the method 100 includes the following steps.

S110. A mobile location center gateway receives a first positioning request for positioning a terminal device from a location service client.

S120. The mobile location center gateway determines a first target PLMN based on the first positioning request, where the first target PLMN is for providing a location service for the terminal device.

S130. The mobile location center gateway sends a second positioning request to a first LMF in the first target PLMN, where the second positioning request requests the first LMF to provide a location service for the terminal device. Correspondingly, the first LMF receives the second positioning request.

S140. The first LMF determines a positioning method based on the second positioning request.

For example, in S110, when the location service client (for example, an LCS client) initiates positioning of a terminal, the location service client sends a positioning request (the first positioning request) to the mobile location center gateway serving the terminal device. The first positioning request includes an identifier of the terminal device, and the identifier may be, for example, a generic public subscription identifier (GPSI) or a subscription permanent identifier (SUPI) of the terminal device. The mobile location center gateway first determines, based on the first positioning request, a privacy setting of the terminal device and whether the location service client has permission to position the terminal device. The privacy setting of the terminal device may be obtained from a UDM based on the identifier of the terminal device, or the privacy setting of the terminal device is already cached or preconfigured in the mobile location center gateway. Positioning permission of the location service client may be preconfigured in the mobile location center gateway.

It should be understood that, in this embodiment of this application, the mobile location center gateway may be an independent network element, for example, may be an HGMLC in the HPLMN. Alternatively, some or all functions of the mobile location center gateway are integrated into a core network element, for example, a network exposure function (NEF) network element. Alternatively, the mobile location center gateway may be another network element that can complete the foregoing function, or the like. This is not limited in this application herein.

It should be further understood that, in this embodiment of this application, the LMF may be an independent network element, or some or all functions of the LMF are integrated into a core network element, for example, an AMF network element. Alternatively, the LMF may be another network element that can complete the foregoing function, or the like. This is not limited in this application herein.

In S120, there may be a plurality of PLMNs that serve the terminal device. Therefore, the mobile location center gateway determines, based on the first positioning request, a first PLMN in the plurality of PLMNs that serve the terminal device, where the first target PLMN is for providing a location service for the terminal device.

In S130, after determining the first PLMN, the mobile location center gateway sends the second positioning request to the first location management network element LMF in the first target PLMN, where the second positioning request requests the first LMF to provide a location service for the terminal device. Correspondingly, the first LMF receives the second positioning request. The second positioning request includes the identifier of the terminal device.

In S140, the first LMF determines the positioning method based on the second positioning request.

According to the positioning method provided in this embodiment of this application, in a scenario in which the terminal device accesses a plurality of PLMNs, the terminal device can be positioned in a multi-PLMN scenario. This clarifies a terminal device positioning technology in the multi-PLMN scenario, improves efficiency and accuracy of terminal device positioning, and improves communication efficiency and user experience.

It should be understood that, in S130, the mobile location center gateway may send the second positioning request to the first location management network element LMF in the first target PLMN in a plurality of manners. For example, the mobile location center gateway may first send the second positioning request to a first GMLC in the first target PLMN, the first GMLC forwards the second positioning request to a first AMF in the first target PLMN, and the first AMF sends the second positioning request to the first LMF. Alternatively, the mobile location center gateway may first send the second positioning request to the first GMLC in the first target PLMN, and the first GMLC forwards the second positioning request to the first LMF. Alternatively, the mobile location center gateway may first send the second positioning request to another network element that has a similar function in the first target PLMN, and the other network element forwards the second positioning request to the first LMF. This is not limited in this application herein.

Figure 6:
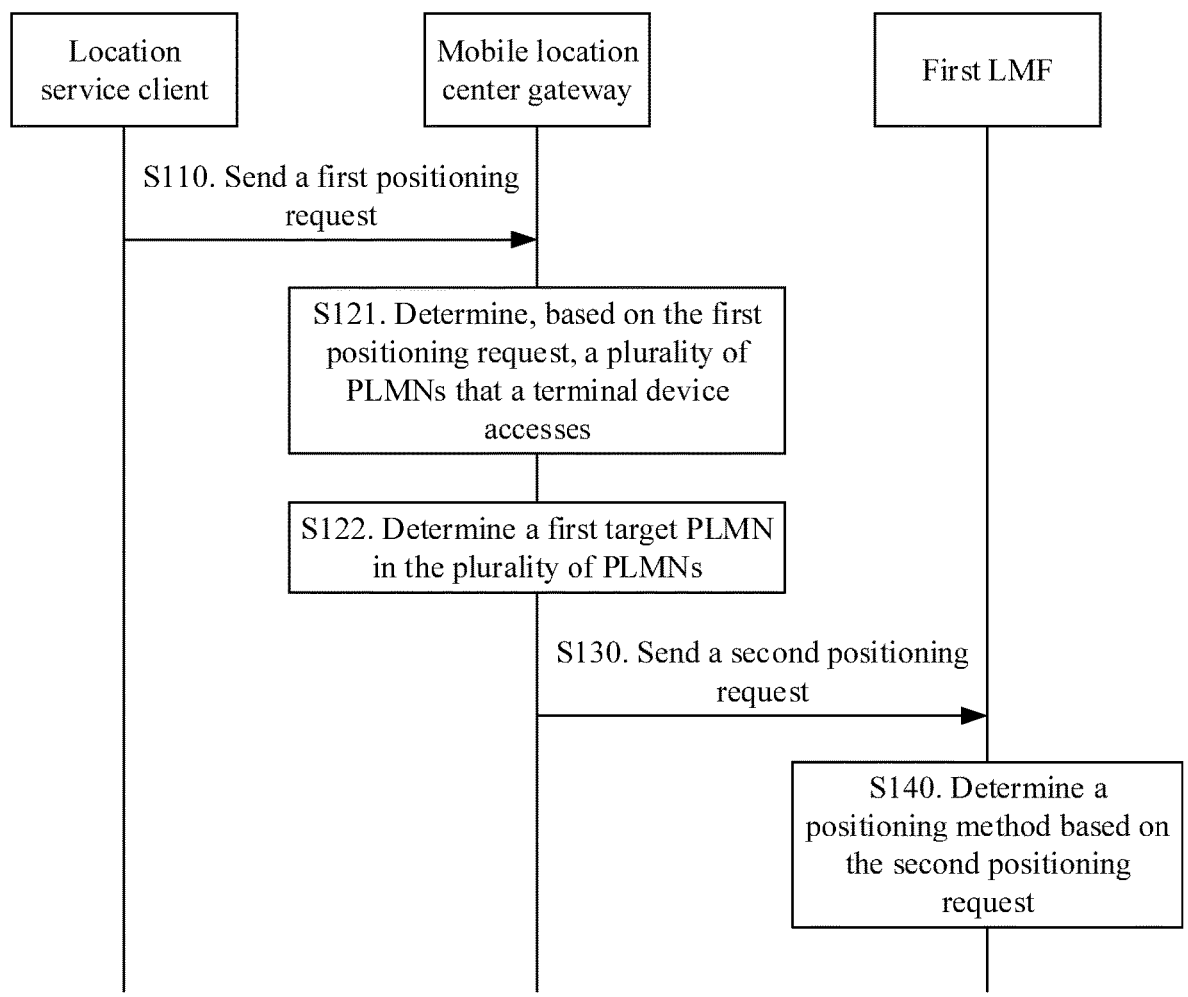
FIG. 6 is a schematic interaction diagram of a positioning method according to another embodiment of this application.

In an embodiment, FIG. 6 is a schematic interaction diagram of a positioning method according to another embodiment of this application. The determining, by the mobile location center gateway, a first target PLMN based on the first positioning request in S120 includes the following steps.

S121. The mobile location center gateway determines, based on the first positioning request, a plurality of PLMNs that the terminal device accesses.

S122. The mobile location center gateway determines the first target PLMN in the plurality of PLMNs.

For example, when the terminal device accesses a plurality of PLMNs, because one PLMN (the first target PLMN) needs to be determined in the plurality of PLMNs, the first target PLMN is for providing a location service for the terminal device. Therefore, the mobile location center gateway first needs to determine, based on the first positioning request, the plurality of PLMNs that the terminal device accesses. Then, the first target PLMN is determined in the plurality of PLMNs.

The following separately describes steps S121 and S122.

The determining, by the mobile location center gateway based on the first positioning request, a plurality of PLMNs that the terminal device accesses in S121 includes: determining, by the mobile location center gateway based on a quantity of addresses of a serving access and mobility management gateway AMF of the terminal device, a quantity of addresses of a serving LMF of the terminal device, or a quantity of addresses of a serving GMLC of the terminal device, the plurality of PLMNs that the terminal device accesses. For example, currently, each PLMN includes an AMF that provides a service for the terminal device, an LMF that provides a service for the terminal device, and a GMLC that provides a service for the terminal device. Therefore, the mobile location center gateway may obtain, from a UDM network element based on the identifier of the terminal device and using a service-based interface, information required for positioning (obtain from an HPLMN). In other words, the mobile location center gateway receives at least one of address information or identifier information of the serving AMF, address information or identifier information of the serving LMF, or address information or identifier information of the serving GMLC from the UDM network element, where the terminal device accesses the serving AMF, the serving LMF and the serving GMLC. The UDM and the mobile location center gateway belong to a same PLMN. In other words, the mobile location center gateway may obtain the identifier information or address information of any one or more of the serving GMLC, the serving LMF, and the serving AMF from the UDM, and determine, based on the quantity of identifiers or addresses of the serving GMLC, the serving LMF, or the serving AMF, the plurality of PLMNs that the terminal device accesses. The plurality of PLMNs are PLMNs that serve the terminal device. It should be understood that the serving GMLC, the serving LMF, and the serving AMF herein may be understood as a GMLC, an LMF, and an AMF included in a PLMN that the terminal device accesses. In other words, the serving GMLC, the serving LMF, and the serving AMF may be replaced with a GMLC, an LMF, and an AMF that the terminal device accesses. For example, assuming that addresses or identifiers of three different AMFs are obtained from the UDM, it may be determined that the terminal device accesses three PLMNs.

It should be understood that, in the foregoing step S121, because the GMLC, the LMF, and the AMF may all be used to identify a PLMN, in S121, the mobile location center gateway may further uniquely determine one PLMN by determining an identifier of the GMLC, an identifier of the LMF, or an identifier of the AMF. In other words, the plurality of PLMNs that the terminal device accesses are determined by determining the identifier of the GMLC, the identifier of the LMF, or the identifier of the AMF. A specific manner of determining the plurality of PLMNs is not limited in this application.

The determining, by the mobile location center gateway, the first target PLMN in the plurality of PLMNs in step S122 includes: determining, by the mobile location center gateway, the first target PLMN in the plurality of PLMNs based on one or more of configuration information of the terminal device, information about an access technology type of the terminal device, or information about a connection status corresponding to the access technology type of the terminal device. The configuration information includes one or more of priority configuration information of the access technology type, priority configuration information of the connection status corresponding to the access technology type, or priority configuration information of the plurality of PLMNs.

For example, the mobile location center gateway may determine the first target PLMN in the following several manners.

The mobile location center gateway determines the first target PLMN in the plurality of PLMNs based on the priority configuration information of the access technology type and the information about the access technology type, where each PLMN corresponds to a different access technology type.

Alternatively, the mobile location center gateway determines the first target PLMN in the plurality of PLMNs based on priority configuration information of the plurality of PLMNs.

Alternatively, the mobile location center gateway randomly determines the first target PLMN in the plurality of PLMNs.

Alternatively, the mobile location center gateway determines the first target PLMN in the plurality of PLMNs based on the priority configuration information of the access technology type, the priority configuration information of the connection status corresponding to the access technology type, the information about the access technology type, and the information about the connection status corresponding to the access technology type of the terminal device.

For example, after determining the plurality of PLMNs, the mobile location center gateway needs to determine the first target PLMN in the plurality of PLMNs. The first target PLMN is for providing a location service for the terminal device. There may be several implementations as follows.

In a possible implementation, the mobile location center gateway determines the first target PLMN in the plurality of PLMNs based on the priority configuration information (included in the configuration information) of the access technology type and the information about the access technology type of the terminal device. Each PLMN corresponds to a different access technology type. One PLMN corresponds to one or more access types, and one access type corresponds to a plurality of connection statuses. Each PLMN corresponds to a different access technology type.

Therefore, the mobile location center gateway may determine, based on priority configuration information of the access technology types corresponding to the plurality of PLMNs and information about access technology types corresponding to the plurality of PLMNs, the first target PLMN. For example, the mobile location center gateway first determines, based on the priorities of the access technology types, a first access technology type in the plurality of access technology types, and then determines the first target PLMN based on a PLMN corresponding to the first access technology type. The priority configuration information of the access technology type may be pre-stored in the mobile location center gateway, or may be obtained from the location service client. The access technology type may be pre-stored in the mobile location center gateway, or may be obtained from the UDM.

The access technology type of the terminal device has at least the following three possibilities: 1. access of the terminal device using a 3GPP technology; 2. access of the terminal device using a non-3GPP technology; and 3. access of the terminal device using a 3GPP technology and using a non-3GPP technology. The priority configuration information of the access technology type may be that 3GPP technology access has a higher priority, or non-3GPP technology access has a higher priority, or the like. A 3GPP technology access type may include satellite access, base station access, and the like. Non-3GPP technology access may include wired access, wireless access, and the like.

In this embodiment of this application, the connection status is specific to an access type, and is mainly classified into an idle state and a connected state. An example is used for description. The connection status of the terminal device includes a status of a first link between the terminal device and a first access point (for example, an NG-RAN) of the first access technology type (for example, a 3GPP access type), or a status of a second link between the terminal device and a second access point (for example, an N3IWF) of a second access technology type (for example, a non-3GPP access type).

In another possible implementation, the mobile location center gateway determines the first target PLMN in the plurality of PLMNs based on the priority configuration information of the plurality of PLMNs. The priority configuration information of the plurality of PLMNs may be included in the configuration information. In addition to determining the first target PLMN based on the access technology type, the mobile location center gateway may further determine the first target PLMN in the plurality of PLMNs based on the priority configuration information of the plurality of PLMNs. For example, when both an HPLMN and a VPLMN serve the terminal device, the VPLMN has a higher priority. The priority configuration information of the plurality of PLMNs may be pre-stored in the mobile location center gateway, or may be obtained from the location service client.

In another possible implementation, the mobile location center gateway determines the first target PLMN in the plurality of PLMNs based on the priority configuration information of the access technology type, the priority configuration information of the connection status corresponding to the access technology type, the information about the access technology type of the terminal device, and the information about the connection status corresponding to the access technology type of the terminal device. When the first target PLMN cannot be determined based on the access technology type, for example, different PLMNs may correspond to a same access type, the mobile location center gateway may determine the first target PLMN in the plurality of PLMNs based on the priority configuration information of the access technology type, the information about the connection status corresponding to the access technology type, the information about the access technology type, and the priority configuration information of the connection status. For example, a range of candidate PLMNs may be first determined based on the priority configuration information of the access technology type and the information about the access technology type, and the plurality of candidate PLMNs may correspond to a same access technology type. Then, the first target PLMN is further determined in the candidate PLMNs based on the information about the connection status corresponding to the access technology type and the priority configuration information of the connection status. The priority configuration information of the connection status may be that a connected state has a higher priority or the like.

In another possible implementation, the mobile location center gateway randomly determines a PLMN in the plurality of PLMNs as the first target PLMN.

It should be understood that, the configuration information may further include priority configuration information of the foregoing several manners of determining the first target PLMN. For example, a priority of a manner of randomly determining the first target PLMN is the lowest. This is not limited in this application herein.

It should be understood that, in this embodiment of this application, the foregoing several manners of determining the first target PLMN in the plurality of PLMNs may be jointly used, in other words, any one or more of the foregoing manners may be used to determine the first target PLMN. For example, when the first target PLMN cannot be determined based on the priority configuration information of the access technology type, the information about the access type, and the information about the connection status, the first target PLMN may be determined in a random selection manner. This is not limited in this embodiment of this application.

The first target PLMN is determined in the plurality of PLMNs in the foregoing several manners, such that accuracy and efficiency of determining the first target PLMN can be improved, and the first target PLMN can be determined more quickly and accurately. In this way, communication resources are reduced, positioning time is reduced, and user experience is further improved.

In S140, the first LMF in the first target PLMN determines the positioning method based on the second positioning request. When determining the positioning method, the first LMF not only considers requirements such as precision and a delay, but also considers a current access technology type of the terminal device, in other words, when other factors (such as precision and a delay) are the same, if access types of the terminal device are different, positioning methods of the terminal device that are determined by the first LMF may be different. Therefore, the second positioning request may further include any one or more of the priority configuration information of the access technology type, the information about the connection status corresponding to the access technology type, the information about the access technology type, the priority configuration information of the connection status, and the identifier of the terminal device.

Figure 7:
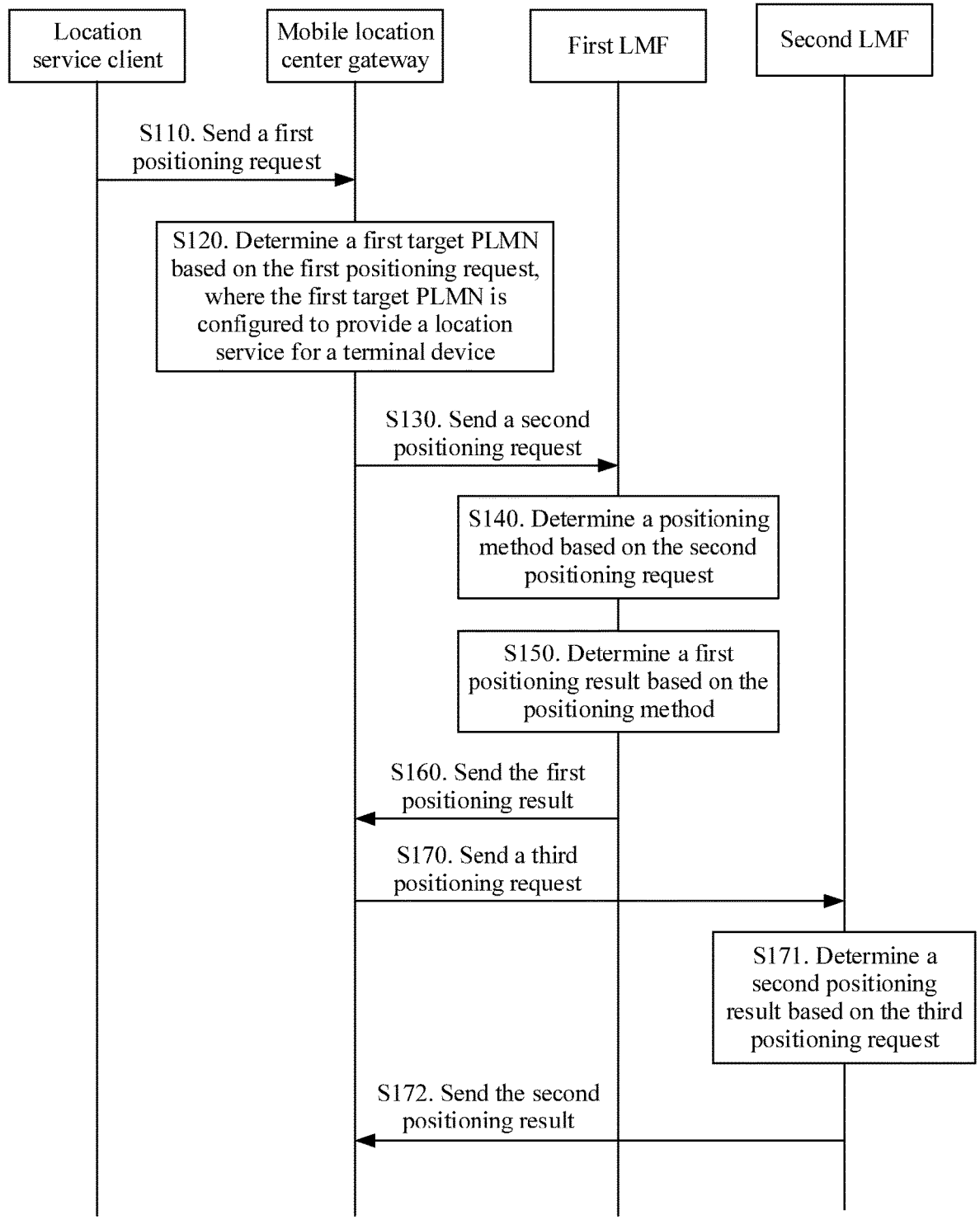
FIG. 7 is a schematic interaction diagram of a positioning method according to another embodiment of this application.

In an embodiment, FIG. 7 is a schematic interaction diagram of a positioning method according to another embodiment of this application. The method 100 further includes the following steps.

S150. The first LMF determines a first positioning result based on the positioning method. For step S150, a process of determining, by the first LMF, the first positioning result based on the positioning method may be an existing process of determining a positioning result based on a positioning method. For example, refer to a positioning result determining method described in Chinese Patent Application No. 201810318534.7. A process of determining the first positioning result based on the positioning method is not limited in this application.

S160. The mobile location center gateway receives the first positioning result of the terminal device from the first LMF.

S170. The mobile location center gateway determines a second target PLMN in the plurality of PLMNs and sends a third positioning request to a second LMF in the second target PLMN when the first positioning result does not meet a positioning requirement, where the third positioning request requests the second LMF in the second target PLMN to provide a location service for the terminal device. Correspondingly, the second LMF in the second target PLMN receives the third positioning request.

S171. The second LMF determines a second positioning result based on the third positioning request. In addition, the second LMF sends the second positioning result to the mobile location center gateway.

S172. The mobile location center gateway receives the second positioning result of the terminal device from the second LMF.

For example, after determining the first positioning result based on the positioning method, the first LMF sends the first positioning result to the mobile location center gateway. The mobile location center gateway determines whether the first positioning result meets a requirement. The first positioning result includes location information (the location information varies according to different used positioning methods) of the terminal device, an indication indicating whether positioning succeeds, a used positioning method, and the like. For example, whether the positioning result meets the positioning requirement may be determined based on the indication indicating whether positioning succeeds in the positioning result and positioning precision corresponding to the positioning result. The first positioning result carries a positioning method used by the first LMF, and the positioning precision may be represented by the used positioning method. In other words, after the positioning method is determined, precision of a positioning result obtained using the positioning method is also determined. The mobile location center gateway sends the third positioning request to the second LMF in the second target PLMN when the first positioning result does not meet the positioning requirement, where the third positioning request requests the second LMF in the second target PLMN to provide a location service for the terminal device. In other words, the second LMF is requested to determine the positioning result, and the second LMF determines the second positioning result and sends the positioning result to the mobile location center gateway.

In the foregoing manner, when a positioning result from the first LMF is inaccurate, a positioning result from a second LMF may be obtained, such that a positioning result of the terminal device is more accurate, and positioning precision and accuracy are improved.

It should be understood that, when the first positioning result meets the positioning requirement, the mobile location center may directly send the first positioning result to the location service client, and does not need to determine the second target PLMN, that is, a positioning procedure ends.

It should be further understood that, a process of determining, by the mobile location center gateway, the second target PLMN in the plurality of PLMNs is similar to the foregoing process of determining the first target PLMN. For corresponding descriptions, refer to the foregoing related descriptions of determining the first target PLMN. For brevity, details are not described herein again.

It should be further understood that, a process of sending, by the mobile location center gateway, the third positioning request to the second LMF in the second target PLMN is similar to the foregoing process of sending, by the mobile location center gateway, the second positioning request to the first LMF. For corresponding descriptions, refer to the foregoing related descriptions of sending the second positioning request to the first LMF. For brevity, details are not described herein again.

Figure 8:
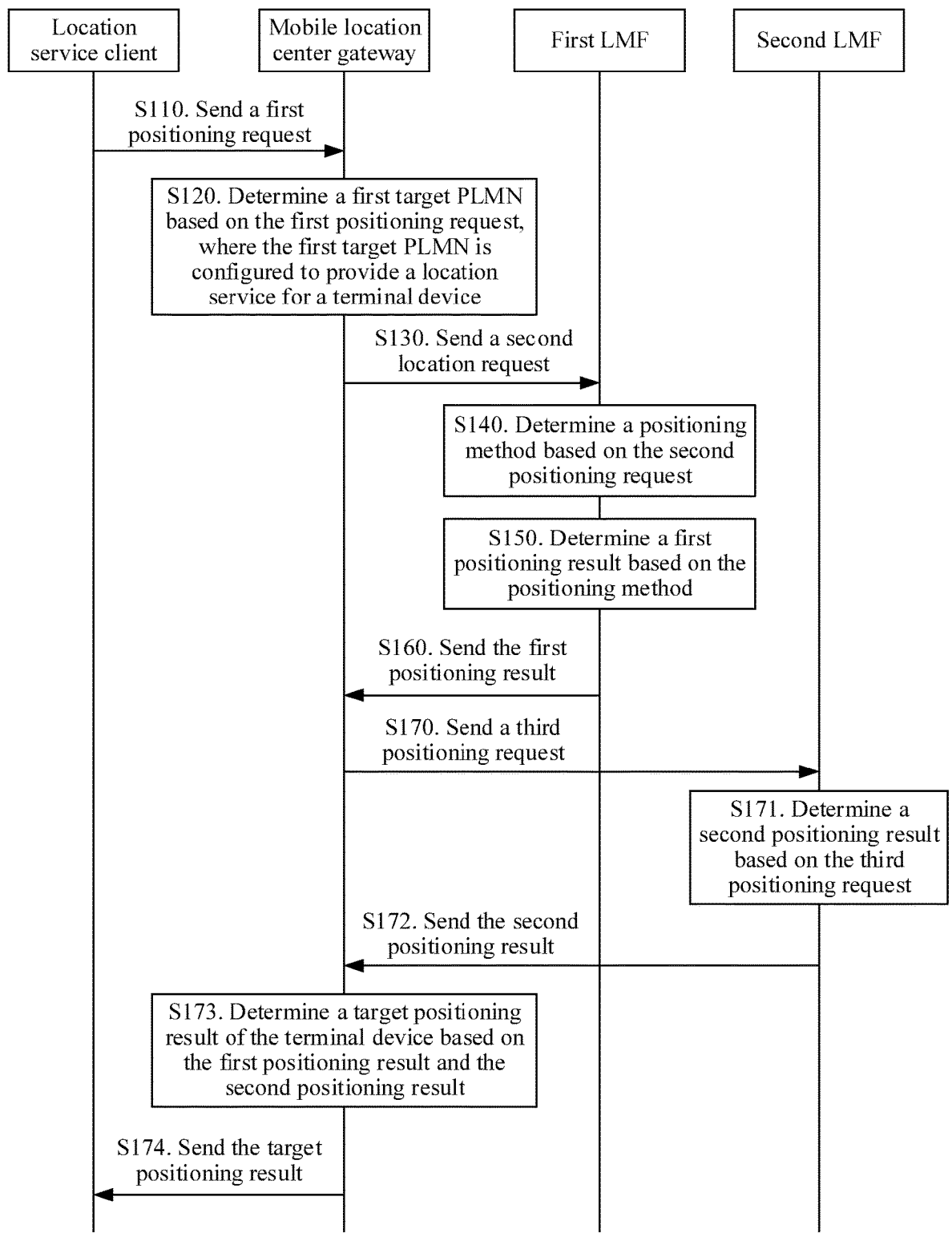
FIG. 8 is a schematic interaction diagram of a positioning method according to another embodiment of this application.

In an embodiment, FIG. 8 is a schematic interaction diagram of a positioning method according to another embodiment of this application. The method 100 further includes the following steps.

S173. The mobile location center gateway determines a target positioning result of the terminal device based on the first positioning result and the second positioning result.

S174. The mobile location center gateway sends the target positioning result to the location service client.

For example, after receiving the first positioning result and the second positioning result, the mobile location center gateway may determine the target positioning result of the terminal device based on the first positioning result and the second positioning result. For example, the target positioning result may be a positioning result with higher positioning precision in the first positioning result and the second positioning result. Then, the target positioning result is sent to the location service client, that is, the positioning procedure ends.

It should be understood that, if the second positioning result does not meet the positioning requirement, the mobile location center gateway may further continue to determine a third target PLMN, then send a positioning request to a third LMF in the third target PLMN, and receive a third positioning result from the third LMF. If the third positioning result meets the requirement, the third positioning result may be sent to the location service client. If the third positioning result does not meet the requirement, a positioning result with highest positioning precision may be selected from the first positioning result, the second positioning result, and the third positioning result as the target positioning result. Alternatively, the mobile location center gateway may further continue to determine a fourth target PLMN, and then send a positioning request to a fourth LMF in the fourth target PLMN. In addition, the mobile location center gateway receives a fourth positioning result from the fourth LMF, and determines a final target positioning result based on the four positioning results. In other words, the mobile location center gateway may determine a plurality of target PLMNs. The plurality of target PLMNs may repeatedly perform a processing procedure of determining the positioning result and reporting the positioning result. This is not limited in this embodiment of this application.

In the foregoing manner, a target positioning result with better precision is determined in the positioning result from the first LMF and the positioning result from the second LMF. Alternatively, a target positioning result with best precision may be determined in positioning results determined by more LMFs, such that the positioning result is more accurate, and positioning precision is improved.

In an embodiment, in addition to the foregoing manner of determining the first target PLMN in the plurality of PLMNs, the determining, by the mobile location center gateway, the first target PLMN in the plurality of PLMNs in step S122 includes the following steps.

Step 1. The mobile location center gateway determines a plurality of PLMNs that the terminal device accesses.

Step 2. The mobile location center gateway sends first instruction information to LMFs in the plurality of PLMNs, where the first instruction information is used to instruct the LMFs in the plurality of PLMNs to determine a positioning method.

Step 3. The mobile location center gateway receives the positioning method from the LMFs in the plurality of PLMNs.

Step 4. The mobile location center gateway determines the first target PLMN based on the received positioning method.

Step 1 is similar to the foregoing S121. For corresponding descriptions, refer to the foregoing process of determining the first target PLMN. For brevity, details are not described herein again. For step 2, after determining the plurality of PLMNs that the terminal device accesses, the mobile location center gateway may send the first instruction information to each LMF in the plurality of PLMNs. The first instruction information is used to instruct each LMF in the plurality of PLMNs to determine the positioning method. The first instruction information may include the positioning requirement, the configuration information, and the like. After receiving the first instruction information, the LMF determines the used access technology type and positioning method. Optionally, the mobile location center gateway may send the first instruction information to some LMFs in the plurality of PLMNs. Correspondingly, each LMF in the plurality of PLMNs determines the positioning method based on the first instruction information, and sends the determined positioning method to the mobile location center gateway. In other words, step 3 is that the mobile location center gateway receives the positioning method from the LMFs in the plurality of PLMNs. It should be understood that, an LMF in each PLMN may determine only one positioning method, or may determine a plurality of positioning methods. For step 4, the mobile location center gateway determines the first target PLMN based on the plurality of received positioning methods.

The determining, by the mobile location center gateway, the first target PLMN based on the received positioning method in step 4 includes: determining, by the mobile location center gateway, a first positioning method based on positioning precision of the positioning method; and determining, by the mobile location center gateway, the first target PLMN based on the first positioning method.

For example, because each positioning method has corresponding positioning precision, after the positioning method is determined, the positioning precision of the positioning method is determined. Therefore, the mobile location center gateway determines the first positioning method based on the positioning precision corresponding to the plurality of positioning methods. For example, the first positioning method may be a positioning method with highest positioning precision in the plurality of positioning methods. After the first positioning method is determined, the first LMF and the first target PLMN to which the first LMF belongs may be determined based on the first LMF corresponding to the first positioning method. The mobile location center gateway may send instruction information to the first LMF, to instruct the first LMF to perform the positioning method. The instruction information may be included in the second positioning request.

The first target PLMN is determined in the plurality of PLMNs in the foregoing several manners, such that accuracy and efficiency of determining the first target PLMN can be improved, and the first target PLMN can be determined more quickly and accurately. In this way, communication resources are reduced, positioning time is reduced, and user experience is further improved.

Optionally, after the mobile location center gateway determines the first positioning method based on the positioning precision of the positioning method, and then determines the first target PLMN based on the first positioning method, the mobile location center gateway may further send instruction information to another PLMN, where the instruction information is used to instruct the other PLMN not to perform a positioning method determined by the other PLMN. In other words, an LMF included in the other PLMN is instructed not to perform the determined positioning method. Optionally, the mobile location center gateway may also instruct, using an implicit instruction, the LMF included in the other PLMN not to perform the determined positioning method. For example, a timer may be set in each LMF. If the LMF receives the second positioning request or the instruction information used to instruct to perform the positioning method before the timer expires, the positioning method is performed. If the LMF does not receive the positioning request or the instruction information, the positioning method is not performed.

Figure 9:
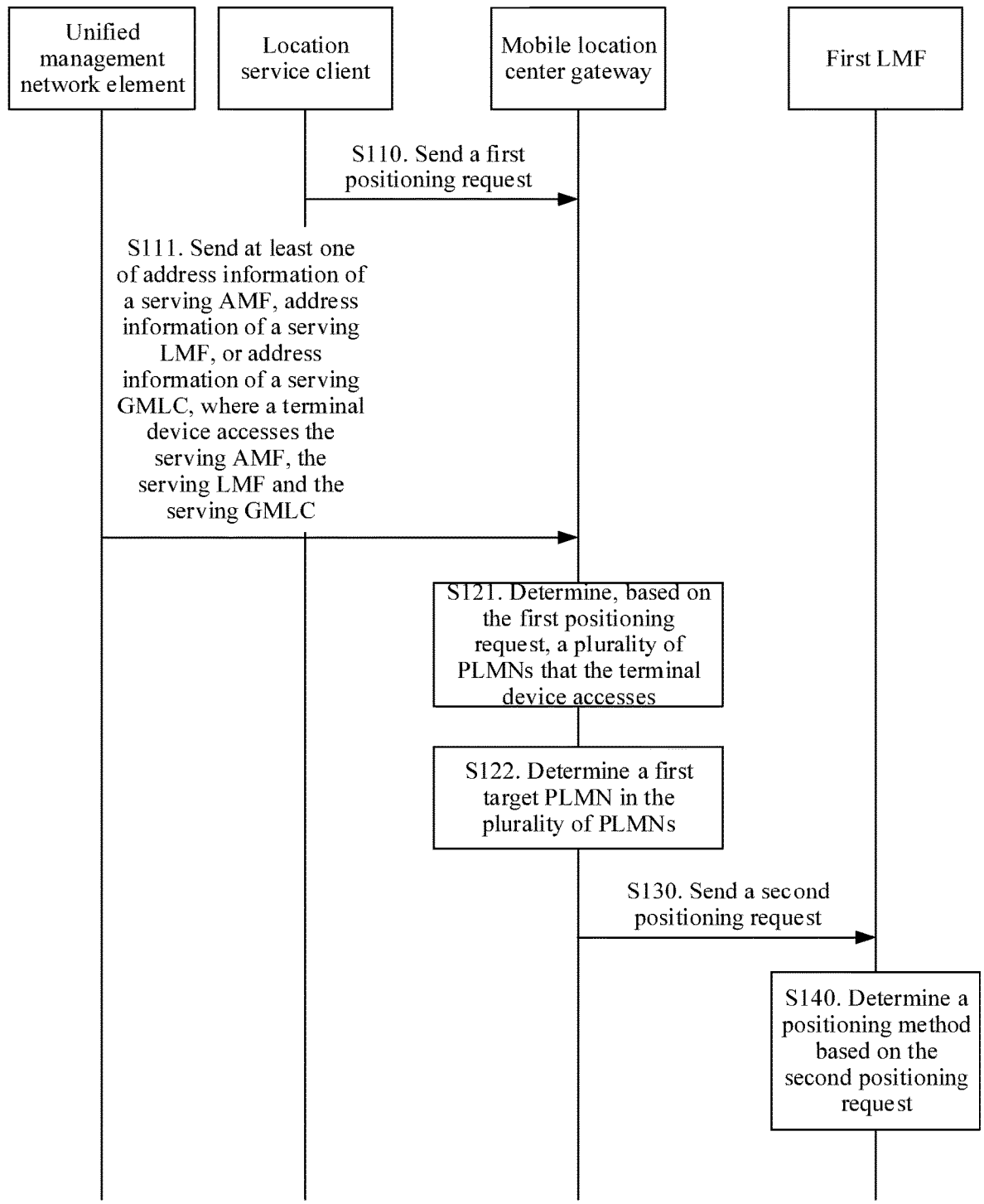
FIG. 9 is a schematic interaction diagram of a positioning method according to another embodiment of this application.

In an embodiment, FIG. 9 is a schematic interaction diagram of a positioning method according to another embodiment of this application. The method 100 further includes the following step.

S111. The mobile location center gateway receives at least one of address information of the serving AMF, address information of the serving LMF, or address information of the serving GMLC from a unified management network element, where the terminal device accesses the serving AMF, the serving LMF and the serving GMLC. The mobile location center gateway determines, based on at least one of the address information of the serving AMF, the address information of the serving LMF, or the address information of the serving GMLC, the plurality of PLMNs that the terminal device accesses. The plurality of PLMNs that the terminal device accesses may include a plurality of serving PLMNs that serve the terminal device. The plurality of serving PLMNs may include a plurality of VPLMNs of the terminal device, and may further include an HPLMN of the terminal device. The unified management network element may be a UDM network element. For a process of determining the plurality of PLMNs that the terminal device accesses, refer to the foregoing process of determining the plurality of PLMNs that the terminal device accesses. For brevity, details are not described herein again.

Figure 10:
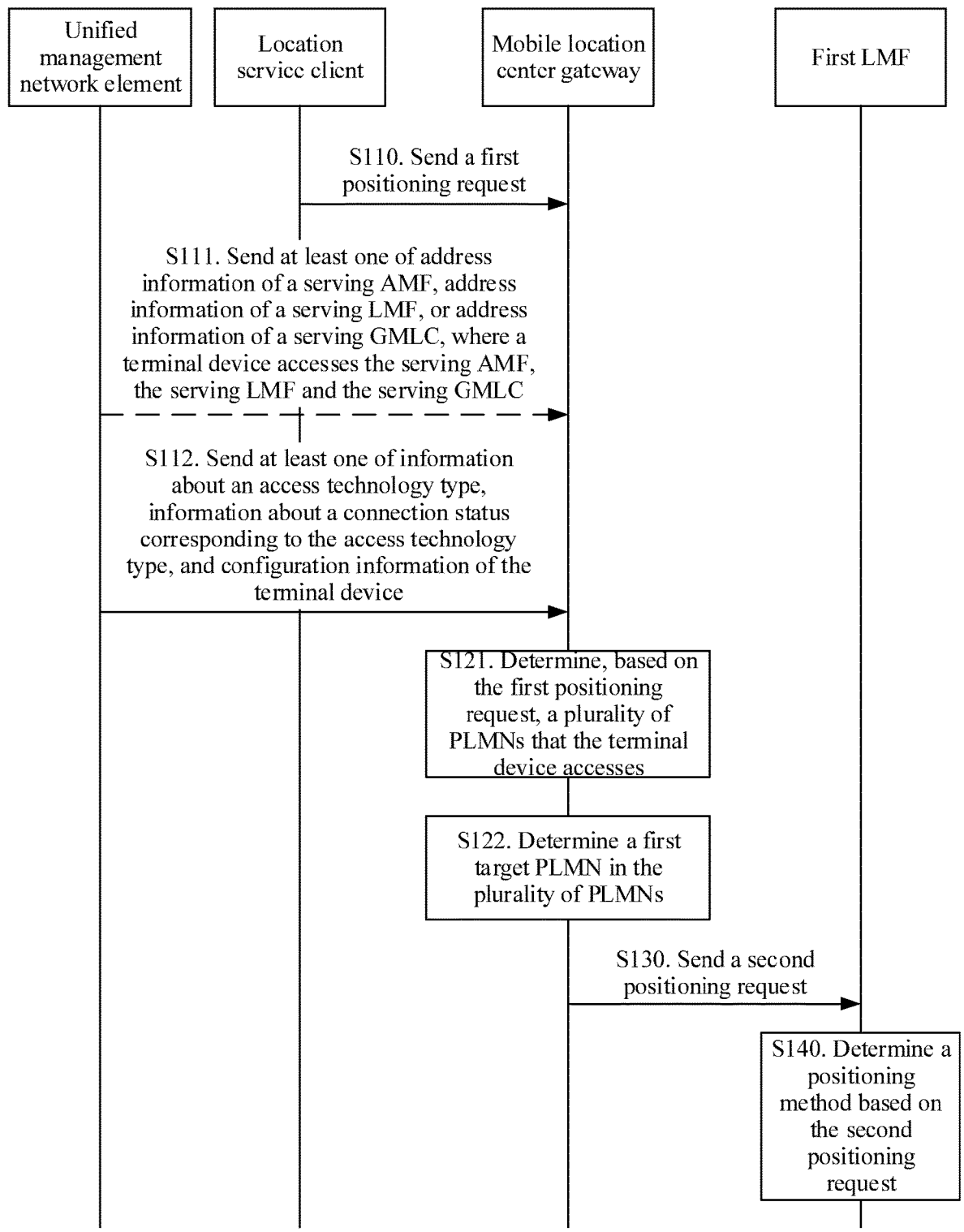
FIG. 10 is a schematic interaction diagram of a positioning method according to another embodiment of this application.

In an embodiment, FIG. 10 is a schematic interaction diagram of a positioning method according to another embodiment of this application. The method 100 further includes the following step.

S112. The mobile location center gateway receives any one or more of the configuration information, the access technology type, or the information about the connection status corresponding to the access technology type that are from the unified management network element. The mobile location center gateway may determine the first target PLMN in the plurality of PLMNs based on one or more of the configuration information, the access technology type, or the information about the connection status corresponding to the access technology type. The unified management network element may be a UDM network element. For a process, refer to the foregoing process of determining the first target PLMN in the plurality of PLMNs. For brevity, details are not described herein again. It should be understood that, a step shown by a dashed line in FIG. 10 is an optional step.

In an implementation, the mobile location center gateway is a GMLC of a HPLMN of the terminal device, that is, the mobile location center gateway is an HGMLC. The first target PLMN is a VPLMN of the terminal device. Alternatively, when there are a plurality of VPLMNs of the terminal device, the first target PLMN is one of the plurality of VPLMNs. Alternatively, when the serving PLMN of the terminal device includes one or more VPLMNs and the HPLMN, the first target PLMN may be the HPLMN of the terminal device. In other words, the HPLMN may provide a location service for the terminal device. This is not limited in this embodiment of this application.

In an embodiment, the second positioning request further includes at least one of the information about the access technology type corresponding to the first target PLMN, the information about the connection status corresponding to the access technology type, and the configuration information.

The following mainly describes, from a perspective of the first LMF, a process of determining, by the first LMF, the positioning method.

Figure 11:
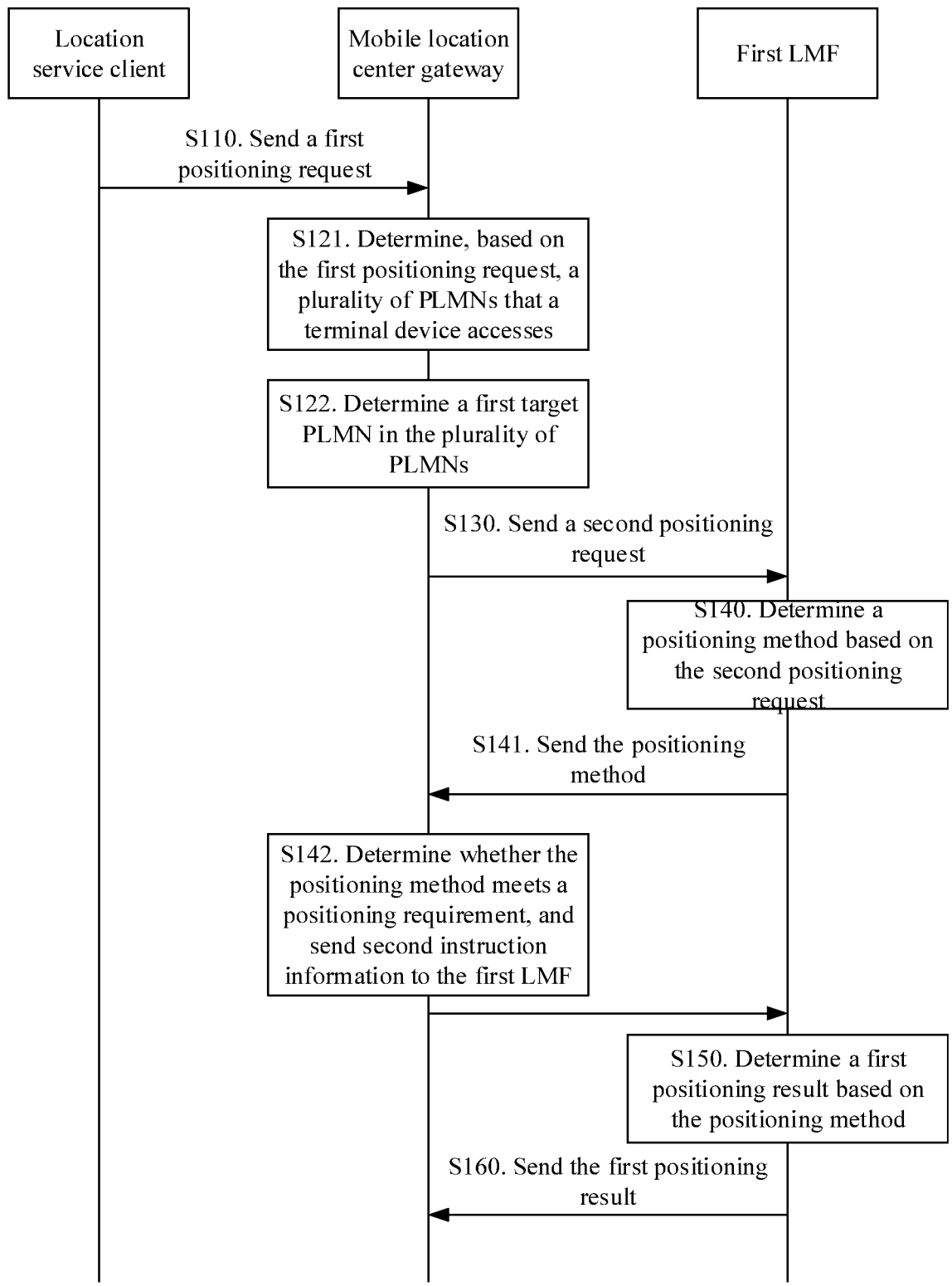
FIG. 11 is a schematic interaction diagram of a positioning method according to another embodiment of this application.

FIG. 11 is a schematic interaction diagram of a positioning method according to another embodiment of this application. The method 100 further includes the following steps.

S141. The first LMF sends the positioning method to the mobile location center gateway. Correspondingly, the mobile location center gateway receives the positioning method.

S142. The mobile location center gateway determines whether the positioning method meets a positioning requirement, and sends second instruction information to the first LMF, where the second instruction information is used to instruct the first LMF to perform the positioning method or not to perform the positioning method. Correspondingly, the first LMF receives the second instruction information from the mobile location center gateway.

For step S142, after receiving the positioning method, the mobile location center gateway determines whether the positioning method meets the positioning requirement. For example, it may be determined, based on positioning precision corresponding to the positioning method, whether the positioning method meets the positioning requirement. If the positioning method meets the positioning requirement, the second instruction information is sent to the first LMF, and the second instruction information is used to instruct the first LMF to perform the positioning method. Alternatively, if the positioning method does not meet the positioning requirement, the second instruction information is used to instruct the first LMF not to perform the positioning method. Correspondingly, the first LMF receives the second instruction information.

Optionally, in addition to the foregoing manner of instructing, using the instruction information, the first LMF to perform or not to perform the positioning method, the first LMF may also be implicitly instructed to perform or not to perform the determined positioning method. For example, a timer may be set in the first LMF. If the first LMF receives the second instruction information before the timer expires, the positioning method is performed. If the first LMF does not receive the instruction information before the timer expires, the positioning method is not performed.

When the second instruction information instructs the first LMF to perform the positioning method, the first LMF may perform the foregoing step S150 and step S160, that is, determine the first positioning result based on the positioning method, and send the first positioning result to the mobile location center gateway.

In an implementation, when the second positioning request further includes the configuration information of the terminal device, the determining, by the first LMF, a positioning method based on the second positioning request in step S140 includes the following steps.

Step 1. The first LMF determines the access technology type of the terminal device based on the configuration information and the information about the access technology type.

Step 2. The first LMF determines the positioning method based on the access technology type.

For example, the second positioning request further includes the configuration information of the terminal device. The configuration information may include one or more of priority configuration information of the access technology type, priority configuration information of the connection status corresponding to the access technology type, and priority configuration information of the plurality of PLMNs. The first LMF may determine the access technology type based on the configuration information and the information about the access technology type. As described above, one LMF may correspond to a plurality of access types, and each access type may correspond to one or more connection statuses. Therefore, the first LMF may determine the access technology type of the terminal device based on the priority configuration information of the access type included in the second positioning request and with reference to the information about the access technology type. Then, the positioning method corresponding to the access technology type is determined based on the access technology type.

Optionally, the first LMF may further determine the positioning method based on the information about the access technology type, the information about the connection status, and the priority configuration information of the connection status. This is not limited in this application.

It should be understood that the second positioning request may further include any one or more of the information about the access technology type and the information about the connection status. The second positioning request may further include the positioning requirement and the like. This is not limited in this application herein.

In another implementation, when the second positioning request further includes the information about the access technology type of the terminal device, the determining, by the first LMF, a positioning method based on the second positioning request in step S140 includes the following step.

Step 1. The LMF determines the positioning method based on the access technology type.

For example, when the second positioning request further includes the information about the access technology type of the terminal device, that is, the mobile location center gateway already determines the access technology type used by the first LMF, the first LMF may directly determine the positioning method based on the access technology type. Optionally, the first LMF may further determine the positioning method based on the information about the access technology type, the information about the connection status, and the priority configuration information of the connection status. This is not limited in this application.

When the second positioning request includes the information about the access technology type already determined by the mobile location center gateway, the second positioning request may further include third instruction information, and the third instruction information is used to instruct the first LMF to determine the positioning method based on the determined access technology type. In other words, the first LMF is instructed to determine the positioning method based on the access technology type included in the second positioning request.

It should be understood that, if the second positioning request includes the information about the access technology type and/or the configuration information of the terminal device, when the first LMF determines the positioning method, the first LMF may use the information about the access technology type and/or the configuration information included in the second positioning request. Alternatively, the first LMF may not use the information about the access technology type and/or the configuration information included in the second positioning request. In other words, the first LMF may also determine an access technology type to be used. For example, the first LMF may determine the access technology type based on a positioning capability supported by the terminal device, a positioning capability supported by a PLMN to which the first LMF belongs, and the positioning requirement included in the second positioning request, to further determine the positioning method.

According to the positioning method provided in this application, when determining the positioning method, the first LMF may determine the positioning method based on the information about the access type or the priority configuration information of the access type from the mobile location center gateway. This can improve efficiency of determining the positioning method by the first LMF, improve precision of the positioning method, and improve a positioning effect.

Figure 12:
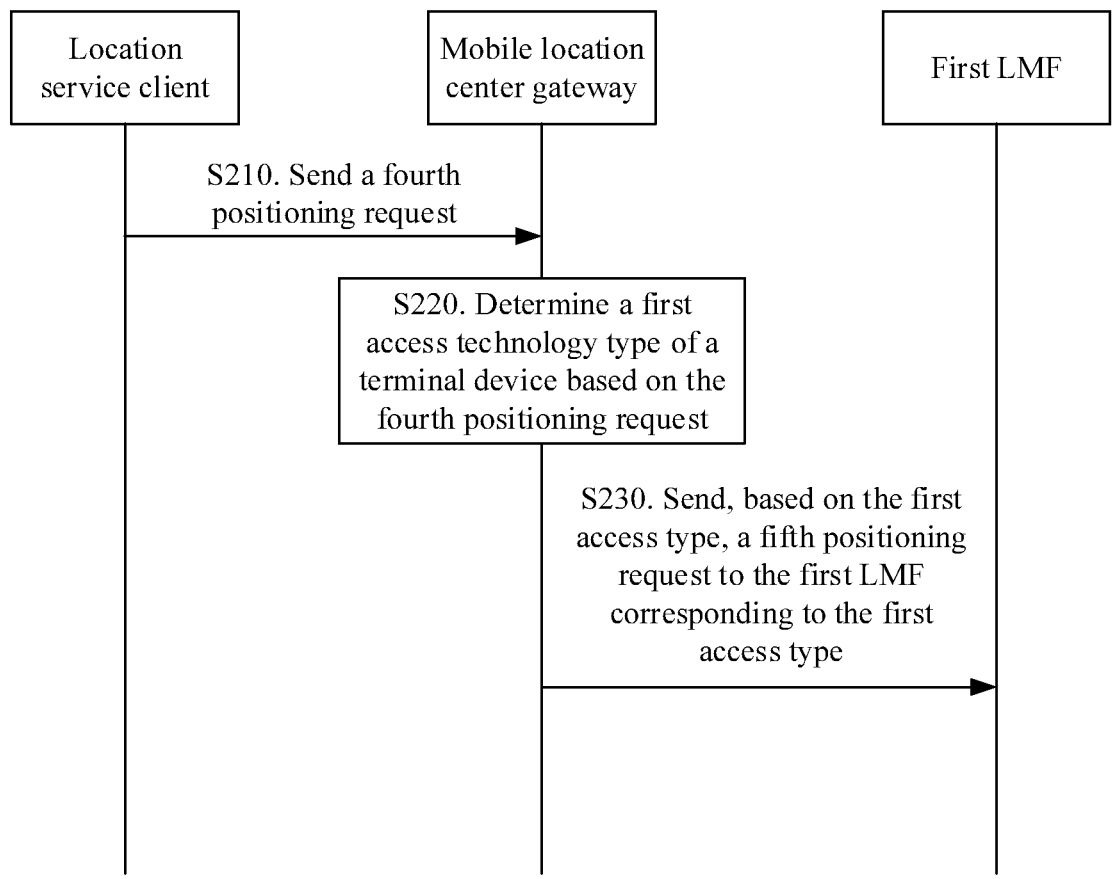
FIG. 12 is a schematic interaction diagram of a positioning method according to another embodiment of this application.

FIG. 12 is a schematic interaction diagram of a positioning method 200 according to another embodiment of this application. As shown in FIG. 12, the method 200 includes the following steps.

S210. A mobile location center gateway receives a fourth positioning request for positioning a terminal device from a location service client, where the fourth positioning request includes an identifier of the terminal device.

S220. The mobile location center gateway determines, based on the fourth positioning request, a first access technology type of the terminal device.

S230. The mobile location center gateway sends, based on the first access type, a fifth positioning request to a first LMF corresponding to the first access type, where the fifth positioning request requests the first LMF to provide a location service for the terminal device. Correspondingly, the first LMF receives the fifth positioning request.

In S210, when the location service client (for example, an LCS client) initiates positioning of a terminal, the location service client sends a positioning request (the fourth positioning request) to the mobile location center gateway serving the terminal device. The fourth positioning request includes the identifier of the terminal device, and for example, may be a GPSI or an SUPI of the terminal device. The mobile location center gateway first determines, based on the fourth positioning request, a privacy setting of the terminal device and whether the location service client has permission to position the terminal device. The privacy setting of the terminal device may be obtained from a UDM based on the identifier of the terminal device, or the privacy setting of the terminal device is already cached or preconfigured in the mobile location center gateway. Positioning permission of the location service client may be preconfigured in the mobile location center gateway.

In S220 and S230, the mobile location center gateway determines, based on the fourth positioning request, the first access technology type of the terminal device. For example, currently, each PLMN includes an AMF that provides a service for the terminal device, an LMF that provides a service for the terminal device, and a GMLC that provides a service for the terminal device. One LMF corresponds to one or more access technology types. Therefore, when the terminal device accesses a plurality of PLMNs that serve the terminal device (when the terminal device accesses a plurality of LMFs), and a first PLMN (a first LMF) that provides a location service for the terminal device needs to be determined in the plurality of PLMNs (namely, the plurality of LMFs), the first PLMN (that is, the first LMF) may be determined in a manner of determining the access technology type. The mobile location center gateway may determine the first access technology type in a plurality of access technology types corresponding to the plurality of LMFs. Then, the first PLMN is determined based on the PLMN corresponding to the first access type, and the first PLMN is configured to provide a location service for the terminal device. After the first PLMN is determined, the first LMF in the first PLMN may be determined. In other words, the mobile location center gateway may determine the first access technology type in the plurality of access technology types corresponding to the plurality of LMFs. Then, the first LMF may be determined based on the first access type. After determining the first LMF, the mobile location center gateway may send, based on the first access type, the fifth positioning request to the first LMF corresponding to the first access type, where the fifth positioning request requests the first LMF to provide a location service for the terminal device. The fifth positioning request includes the identifier of the terminal device.

According to the positioning method provided in this embodiment of this application, in a scenario in which the terminal device accesses a plurality of LMFs, an LMF that provides a service for the terminal device may be determined based on the access technology type, such that the terminal device can be positioned in an LMF scenario. This clarifies a terminal device positioning technology in the multi-LMF scenario, and improves communication efficiency and user experience.

Figure 13:
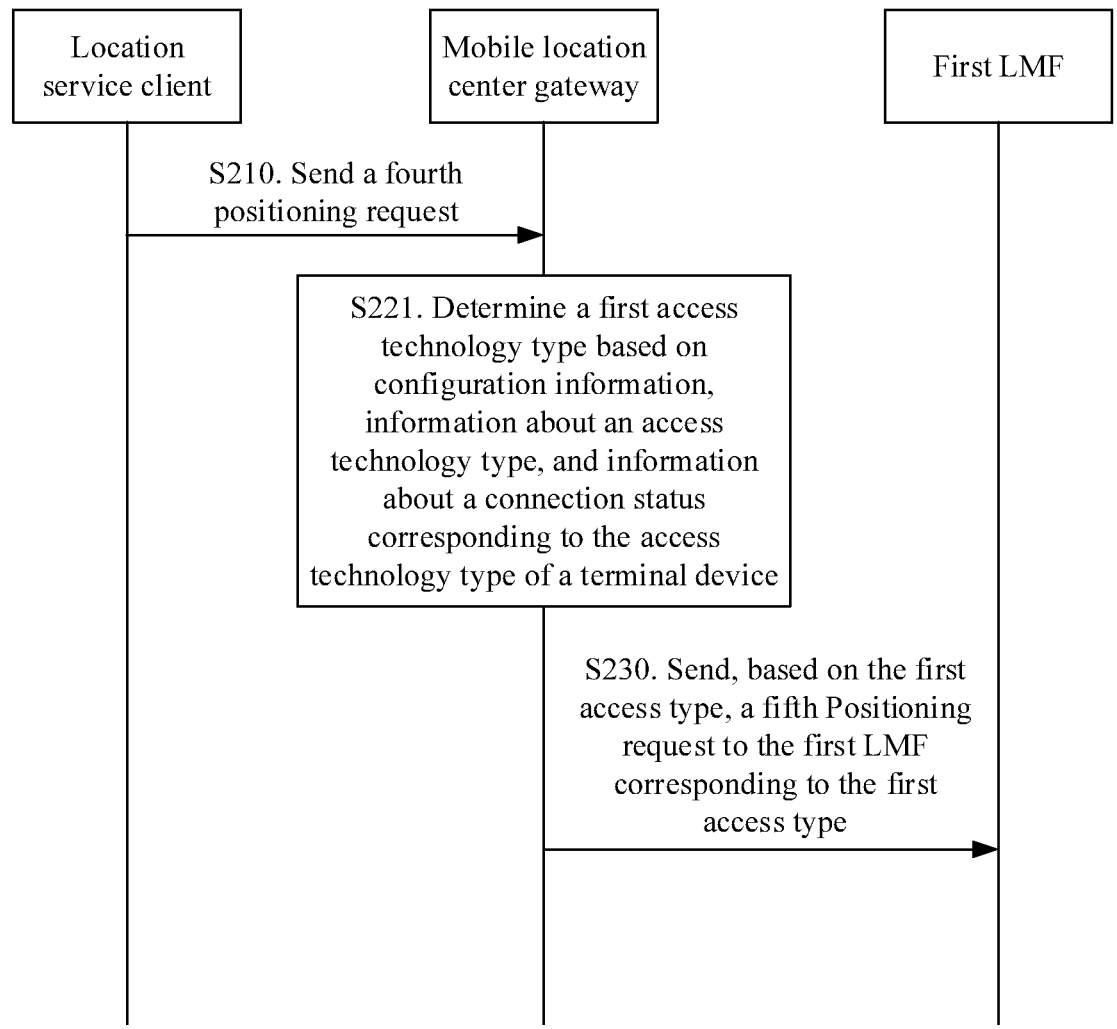
FIG. 13 is a schematic interaction diagram of a positioning method according to another embodiment of this application.

In an embodiment, as shown in FIG. 13, the determining, by the mobile location center gateway, a first access technology type of the terminal device in S220 includes the following step.

S221. The mobile location center gateway determines the first access technology type based on the configuration information of the terminal device, the information about the access technology type of the terminal device, and the information about the connection status corresponding to the access technology type of the terminal device.

For example, one PLMN that serves the terminal device corresponds to one or more access types, and one access type corresponds to a plurality of connection statuses. Each PLMN corresponds to a different access technology type. Therefore, the mobile location center gateway may determine the first access technology type based on the configuration information, the information about the access technology type of the terminal device, and the information about the connection status corresponding to the access technology type of the terminal device. The configuration information may include one or more of priority configuration information of the access technology type, priority configuration information of the connection status corresponding to the access technology type, and priority configuration information of the plurality of PLMNs. The mobile location center gateway may determine, based on the priority configuration information of the access technology type, the information about the connection status corresponding to the access technology type, and the information about the access technology type, the first access technology type in a plurality of access technology types. For example, the first access technology type may be determined based on the priority configuration information of the access technology type and the plurality of access technology types. The first access technology type uniquely corresponds to one first LMF. In this way, accuracy and efficiency of determining the first LMF can be improved, and the first LMF can be determined more quickly and accurately. In this way, communication resources are reduced, positioning time is reduced, and user experience is further improved.

Optionally, if the access technology type determined based on the priority configuration information of the technology type and the plurality of access technology types corresponds to a plurality of different LMFs, in other words, the LMF cannot be uniquely determined based on the priority configuration information of the technology type and the plurality of access technology types, the mobile location center gateway may further determine the first access technology type. That is, the mobile location center gateway may determine the first LMF, based on the connection status with reference to the information about the connection status corresponding to the access technology type and the priority configuration information of the connection status.

It should be understood that the configuration information may be pre-stored in the mobile location center gateway, or may be obtained from the location service client. The access technology type may be pre-stored in the mobile location center gateway, or may be obtained from the UDM. The connection status may be pre-stored in the mobile location center gateway, or may be obtained from the UDM.

It should be further understood that the mobile location center gateway may further randomly determine the first access technology type in the plurality of access types, and then send the fifth positioning request to the first LMF corresponding to the first access type. This is not limited in this embodiment of this application.

Figure 14:
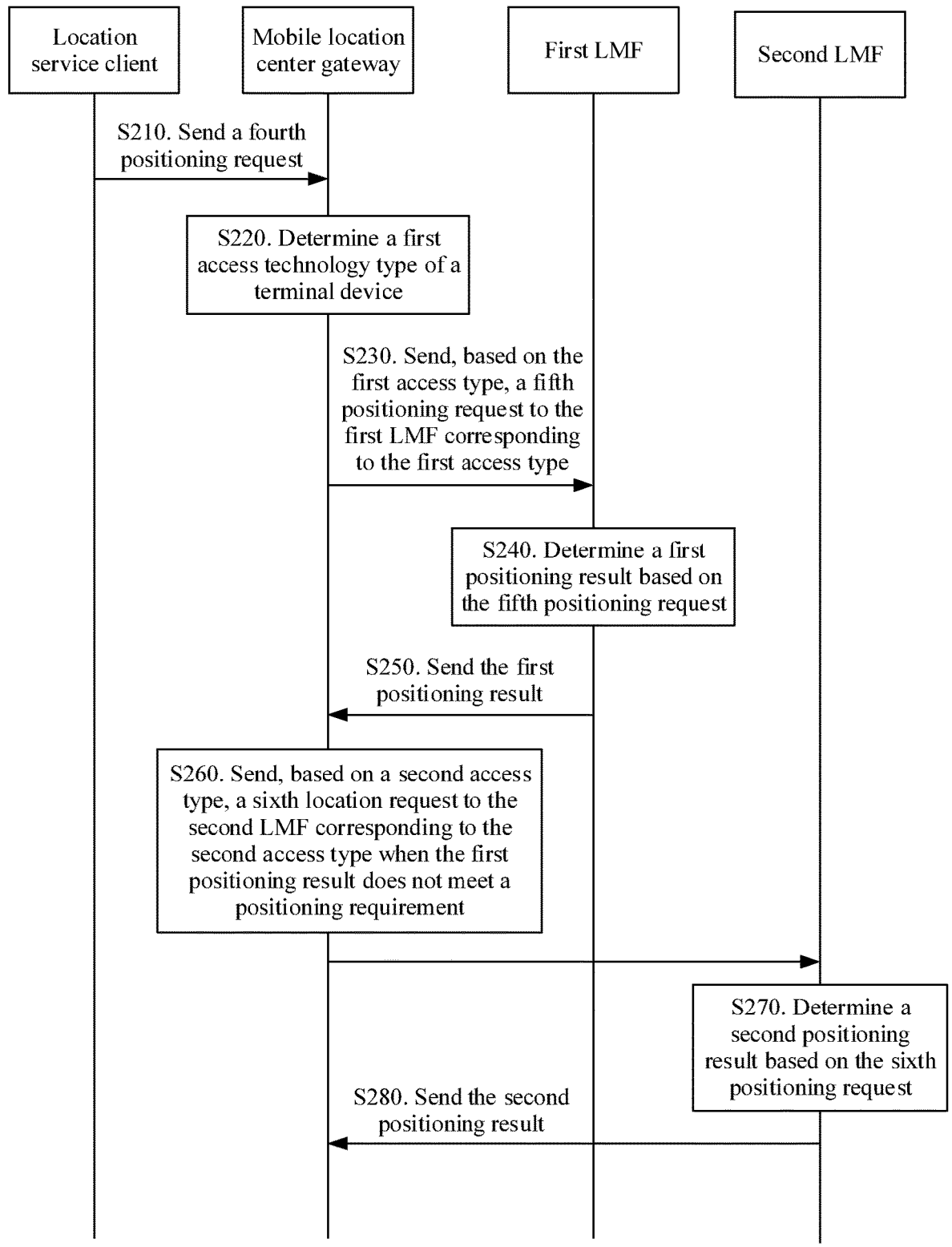
FIG. 14 is a schematic interaction diagram of a positioning method according to another embodiment of this application.

In an embodiment, as shown in FIG. 14, the method 200 further includes the following steps.

S240. The first LMF determines the first positioning result based on the fifth positioning request.

S250. The mobile location center gateway receives the first positioning result of the terminal device from the first LMF.

S260. The mobile location center gateway sends, based on a second access type, a sixth positioning request to a second LMF corresponding to the second access type when the first positioning result does not meet a positioning requirement, where the sixth positioning request requests the second LMF to provide a location service for the terminal device.

S270. The second LMF determines a second positioning result.

S280. The mobile location center gateway receives the second positioning result of the terminal device from the second LMF.

Figure 15:
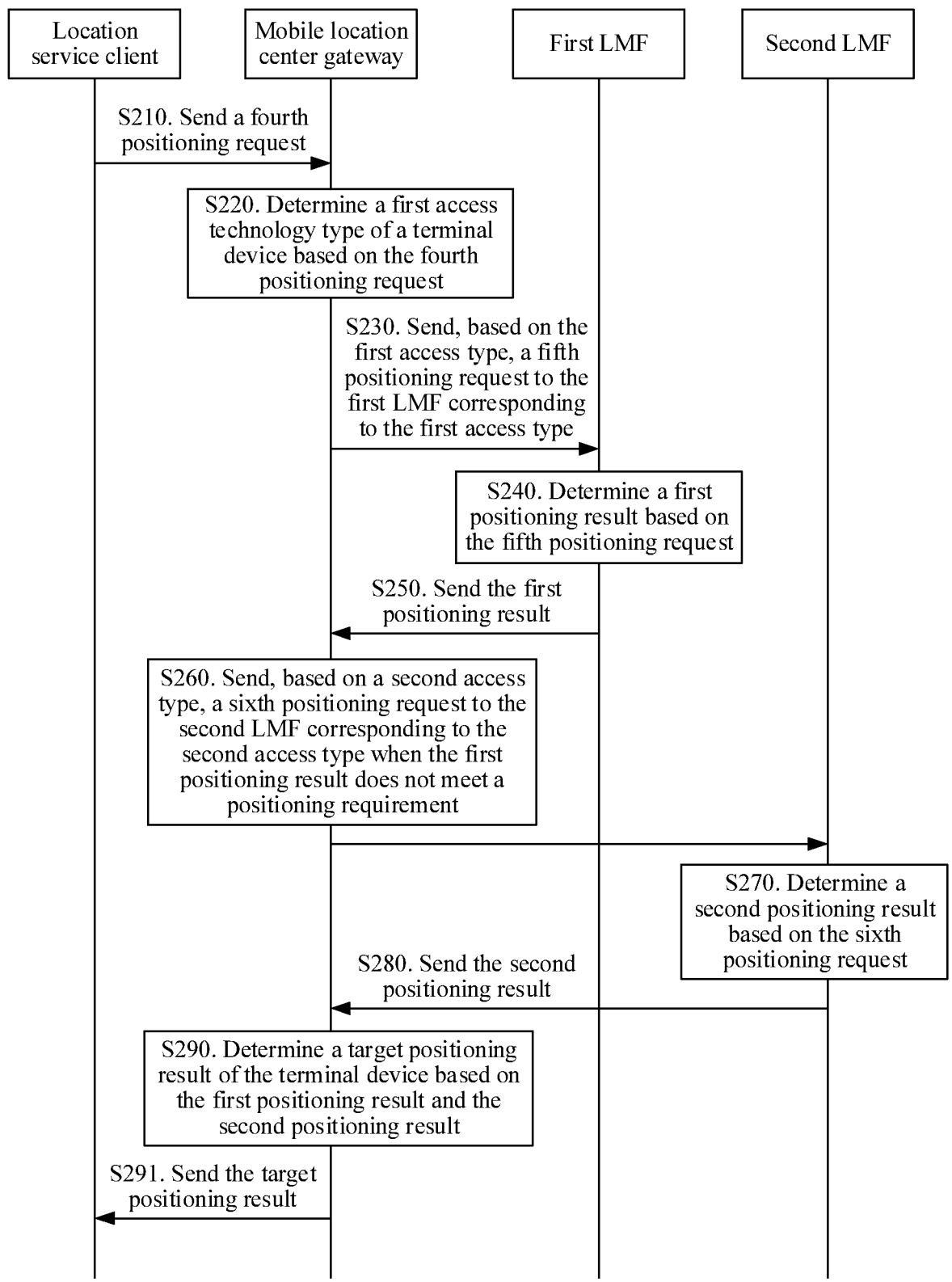
FIG. 15 is a schematic interaction diagram of a positioning method according to another embodiment of this application.

In an embodiment, as shown in FIG. 15, the method 200 further includes the following steps.

S290. The mobile location center gateway determines a target positioning result of the terminal device based on the first positioning result and the second positioning result.

S291. The mobile location center gateway sends the target positioning result to the location service client.

In an embodiment, the method 200 further includes: receiving, by the mobile location center gateway, at least one of address information of the serving AMF, address information of the serving LMF, or address information of the serving GMLC from a unified management network element, where the terminal device accesses the serving AMF, the serving LMF and the serving GMLC.

In an embodiment, the method 200 further includes: receiving, by the mobile location center gateway, at least one of the configuration information, the information about the access technology type, or the information about the connection status corresponding to the access technology type that are from the unified management network element.

It should be understood that, steps in the embodiment of the method 200 are similar to corresponding steps in a related embodiment of the method 100. For similar descriptions, refer to the descriptions of the method 100. To avoid repetition, details are not described herein again.

The following describes, with reference to an example, a procedure of a positioning method provided in this application.

Figure 16A:
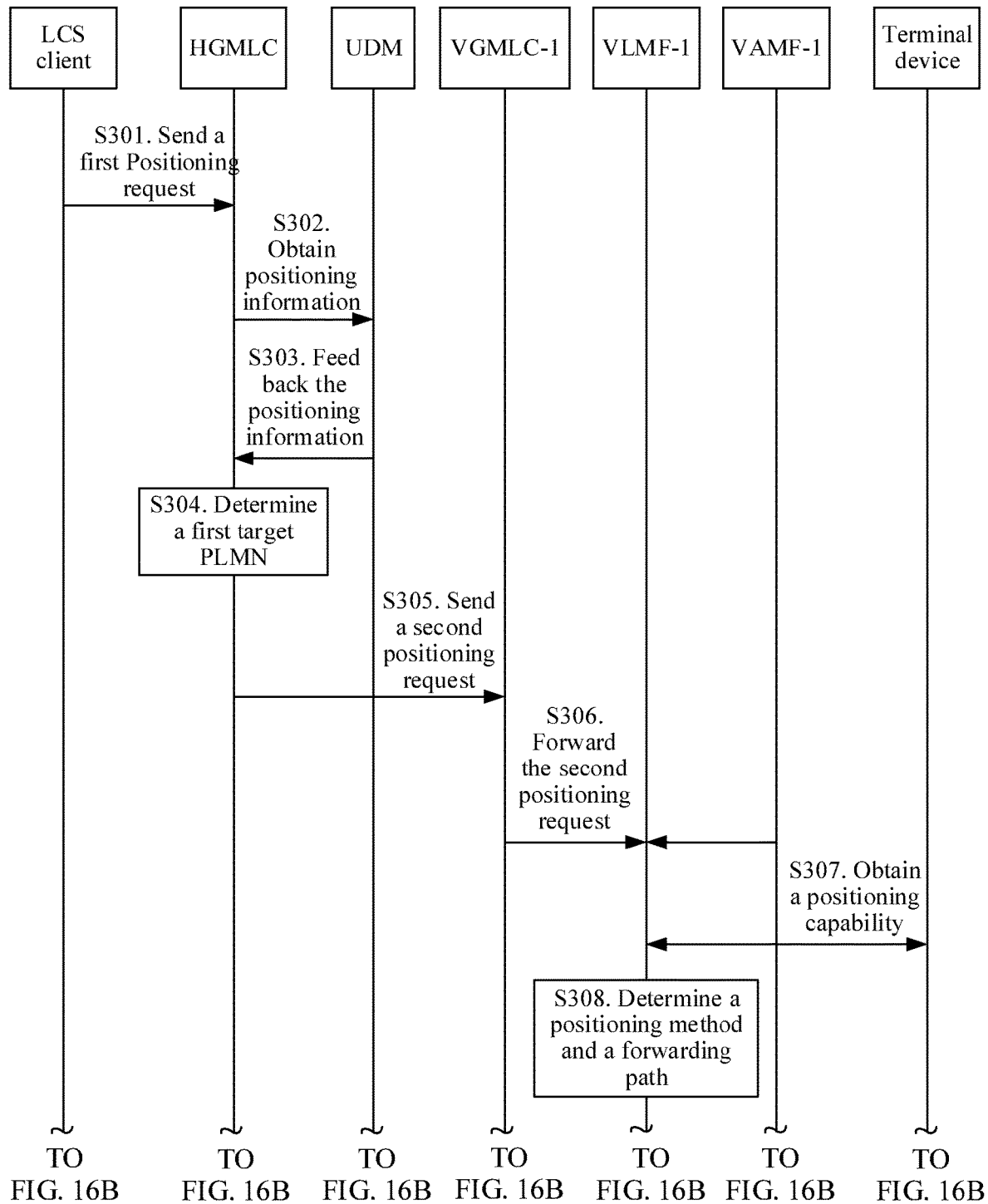
FIG. 16A and FIG. 16B are schematic interaction diagrams of a positioning method according to another embodiment of this application.
Figure 16B:
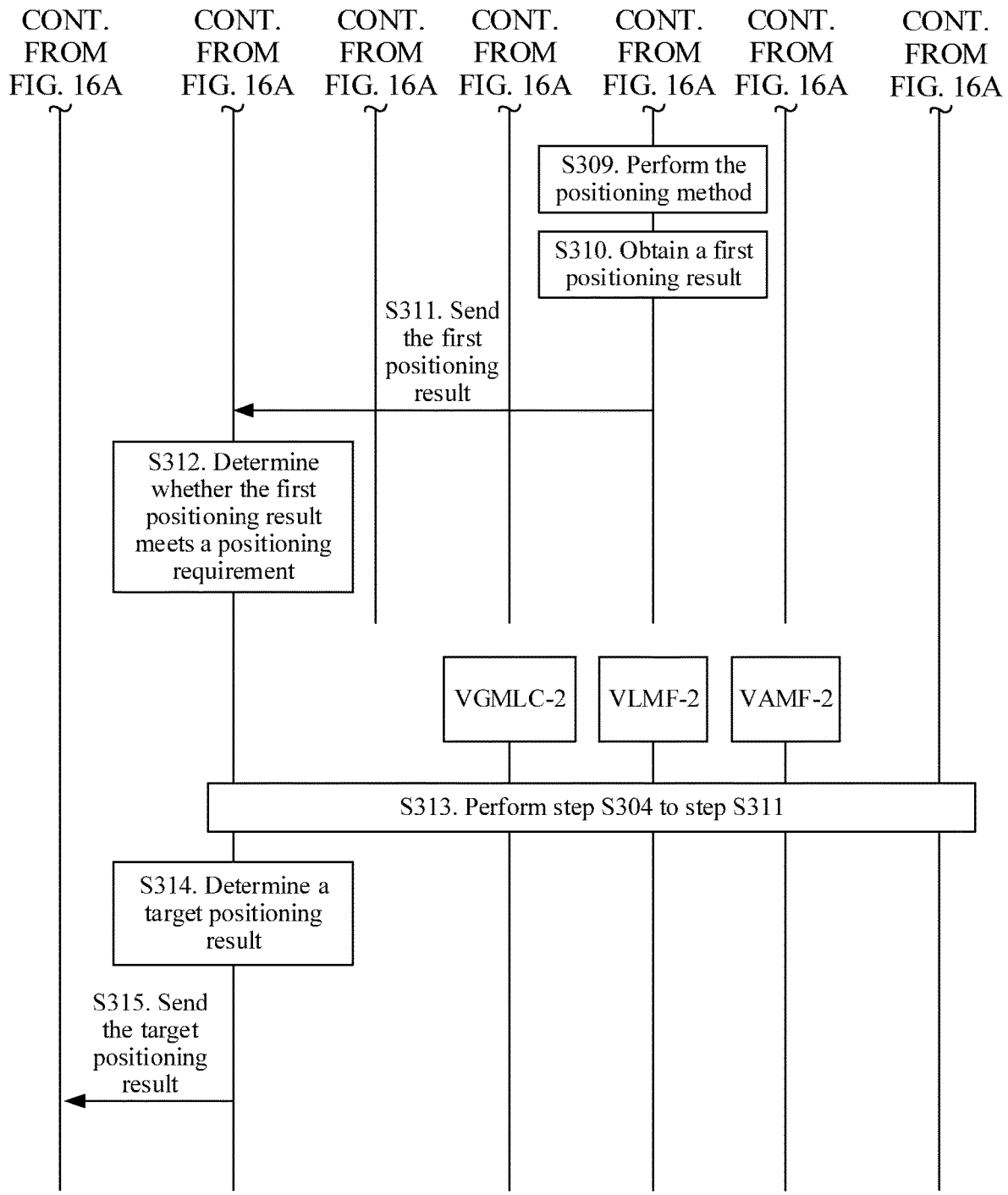

FIG. 16A and FIG. 16B are schematic flowcharts of a positioning method 300 according to an embodiment of this application.

As shown in FIG. 16A and FIG. 16B, the method 300 includes the following steps.

S301. An external LCS client sends a first positioning request for positioning a terminal device to a mobile location center gateway (an HGMLC in an HPLMN), where the first positioning request includes an identifier of the terminal device, for example, a GPSI or an SUPI of a target terminal device; the HGMLC first determines a privacy setting of the target terminal device and whether the LCS client has permission to position the terminal device. The privacy setting of the terminal device may be obtained from a UDM in the HPLMN based on the identifier of the terminal device, or the privacy setting of the terminal device is already cached or preconfigured in the HGMLC. The positioning permission of the LCS client is preconfigured in the HGMLC.

S302. The HGMLC obtains, from the UDM based on identifier information (a GPSI, an SUPI, or the like) of the terminal device and using a service-based interface (for example, Nudm_UE Context Management_Get), information required for positioning, for example, information such as an address of a serving AMF (VAMF), an address of a serving LMF (VLMF), or an address of a serving GMLC (VGMLC).

S303. For each access technology type of the terminal device, the UDM feeds back positioning information, where the positioning information includes the address of the VAMF. The positioning information may also include the address of the VGMLC address or the address of the VLMF. If the HGMLC needs to obtain an access type and/or a connection status (for example, the HGMLC needs to determine a target PLMN based on a priority configuration of an access type and/or a priority configuration of a connection status, or the HGMLC needs to transmit the information), the UDM simultaneously feeds back the access type and/or the connection status.

S304. When the HGMLC finds, based on a quantity of addresses of a network element, such as the VAMF, returned by the UDM, that the terminal device accesses different PLMNs, the HGMLC selects, based on the priority configuration of the access technology type and/or the priority configuration of the connection status, a PLMN (the first target PLMN) for positioning. Alternatively, the HGMLC may randomly select a PLMN (the first target PLMN) for positioning. The first target PLMN is for providing a location service for the terminal device. The priority configuration of the access technology type may be pre-configured in the HGMLC or obtained from the first positioning request from the LCS client. For example, the priority configuration of the access technology type may be that 3GPP access has a higher priority or N3GPP access has a higher priority. The access type refers to a technology used by the terminal device to access a 5G core network, for example, 3GPP access or N3GPP access. The N3GPP access includes trusted N3GPP access and untrusted N3GPP access. The connection status is specific to a particular access type, and includes an idle state and a connected state.

S305. After determining the first target PLMN (a VPLMN-1), the HGMLC sends a second positioning request to the GMLC (a VGMLC-1) in the first target PLMN. The second positioning request may include information such as the access type and/or the connection status, or may include information such as an address of a VAMF-1 and an address of a VLMF-1 in the first target PLMN, and an identifier of the terminal device.

S306. The VGMLC-1 further forwards the second positioning request to the VLMF-1 network element. According to different solutions, the VGMLC-1 may forward the second positioning request to the VLMF-1 indirectly using the VAMF-1, and finally, the VLMF-1 receives the second positioning request. Alternatively, the VGMLC-1 may directly send the second positioning request to the VLMF-1.

S307. If the VLMF-1 does not obtain the positioning capability supported by the terminal device, the VLMF-1 needs to first interact with the terminal device to obtain the positioning capability supported by the terminal device. The positioning capability mainly includes: a positioning method supported by the terminal device, a positioning device (for example, whether a global positioning system (GPS) module is included) supported by the terminal device, and the like.

S308. The VLMF-1 determines the positioning method and a forwarding path based on information such as the positioning capability supported by the terminal device, a positioning capability supported by a network (similar to the positioning capability supported by the terminal device), a positioning requirement included in the second positioning request, the access technology type, and the connection status.

S309. The VLMF-1 performs the positioning method.

S310. The VLMF-1 obtains a first positioning result.

S311. The VLMF-1 returns the first positioning result to the VGMLC-1. The VGMLC-1 finally returns the first positioning result to the HGMLC.

S312. After receiving the first positioning result, the HGMLC determines, based on the positioning precision and the indication information indicating whether positioning succeeds that is included in the first positioning result, whether the first positioning result meets a positioning requirement. The positioning requirement mainly includes precision, a delay, and the like. Processing varies with the first positioning result as follows.

(a) If the positioning succeeds, and the precision meets a requirement, the first positioning result is returned to the LCS client, and the positioning ends.

(b) If the positioning succeeds, but the precision does not meet the requirement, S313 is performed.

(c) If the positioning fails, S313 is performed.

S313. The HGMLC determines a second target PLMN, forwards the positioning request to the second target PLMN, and receives a second positioning result from a VLMF-2. That is, for the second target PLMN, step 304 to step S311 are performed.

S314. The HGMLC compares the first positioning result and the second positioning result (a positioning result determined by the second target PLMN). A target positioning result with higher precision is determined. If neither the first positioning result nor the second positioning result meets the positioning requirement, the first positioning result and the second positioning result are used as the target positioning result.

S315. The HGMLC feeds back a target positioning result to the LCS client.

It should be understood that the foregoing solution is also applicable to a single-PLMN scenario. In S304, when the HGMLC detects that only one PLMN serves the terminal device, the serving PLMN in this case may be the VPLMN-1, or may be the HPLMN. In this case, the HGMLC forwards the second positioning request to the VAMF-1 or the VLMF-1 in the VPLMN-1, or forwards the second positioning request to the HAMF or the HLMF in the HPLMN. Subsequent processing steps are S306-S311 and S315.

It should be further understood that the technical solution in the method 300 is also applicable to a scenario in which both the VPLMN and the HPLMN serve the terminal device. That is, the VLMF-1 and the VAMF-1 in the method 300 may be replaced with the HLMF and the HAMF. In other words, in a scenario in which the PLMN that serves the terminal device includes the VPLMN and the HPLMN, the first target PLMN or the second target PLMN may alternatively be the HPLMN. This is not limited in this application herein.

It should be further understood that the method 300 is described using an example in which two VPLMNs separately perform positioning. However, the foregoing technical solution may be further applied to a scenario in which more VPLMNs separately perform positioning. For example, if neither the first positioning result nor the second positioning result meets the positioning requirement, the second target PLMN (a VPLMN-3) may continue to be determined, and the third positioning result fed back by the VPLMN-3 may be obtained. Then, the target positioning result is determined in the three positioning results. This is not limited in this application herein.

Figure 17A:
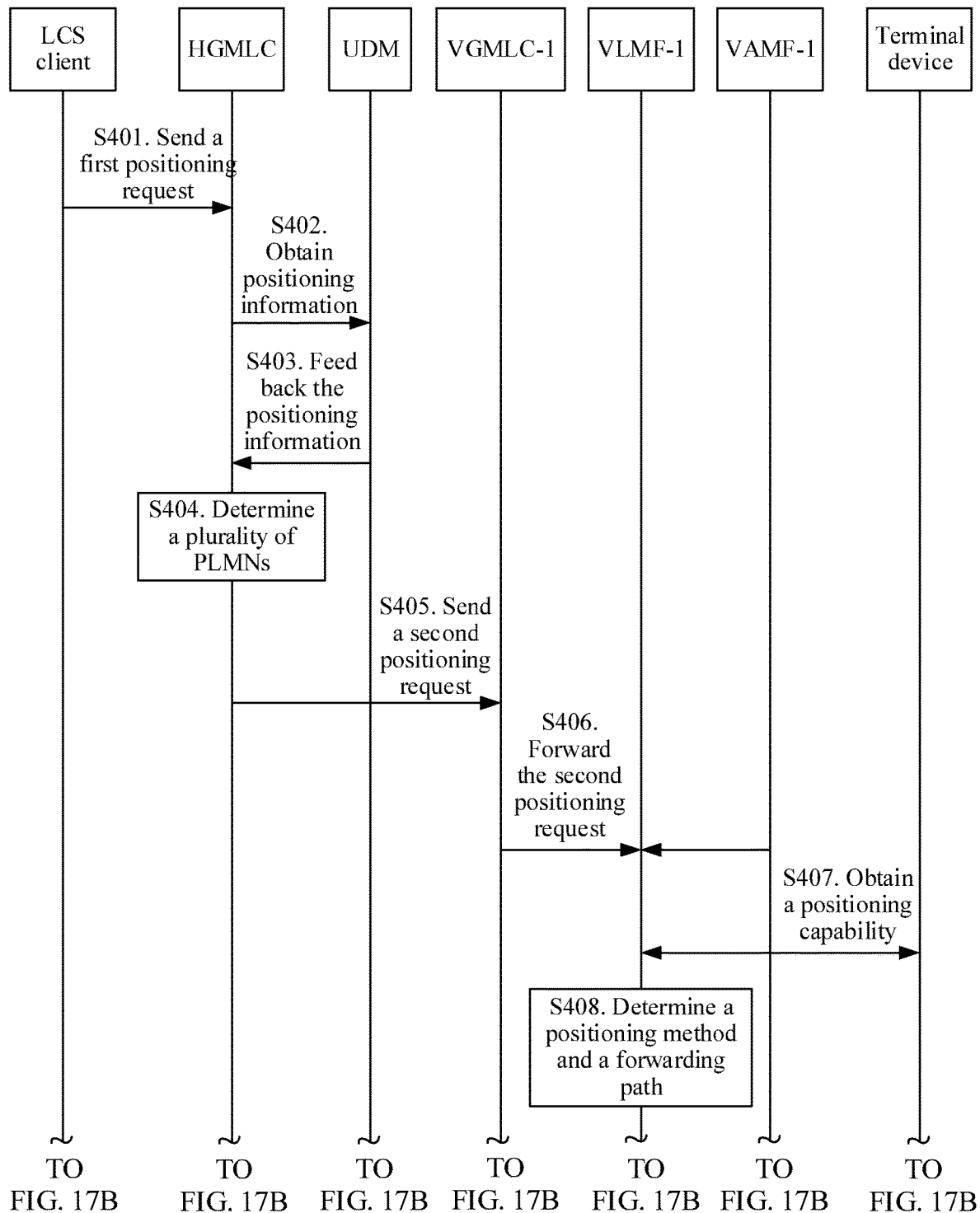
FIG. 17A and FIG. 17B are schematic interaction diagrams of a positioning method according to another embodiment of this application.
Figure 17B:
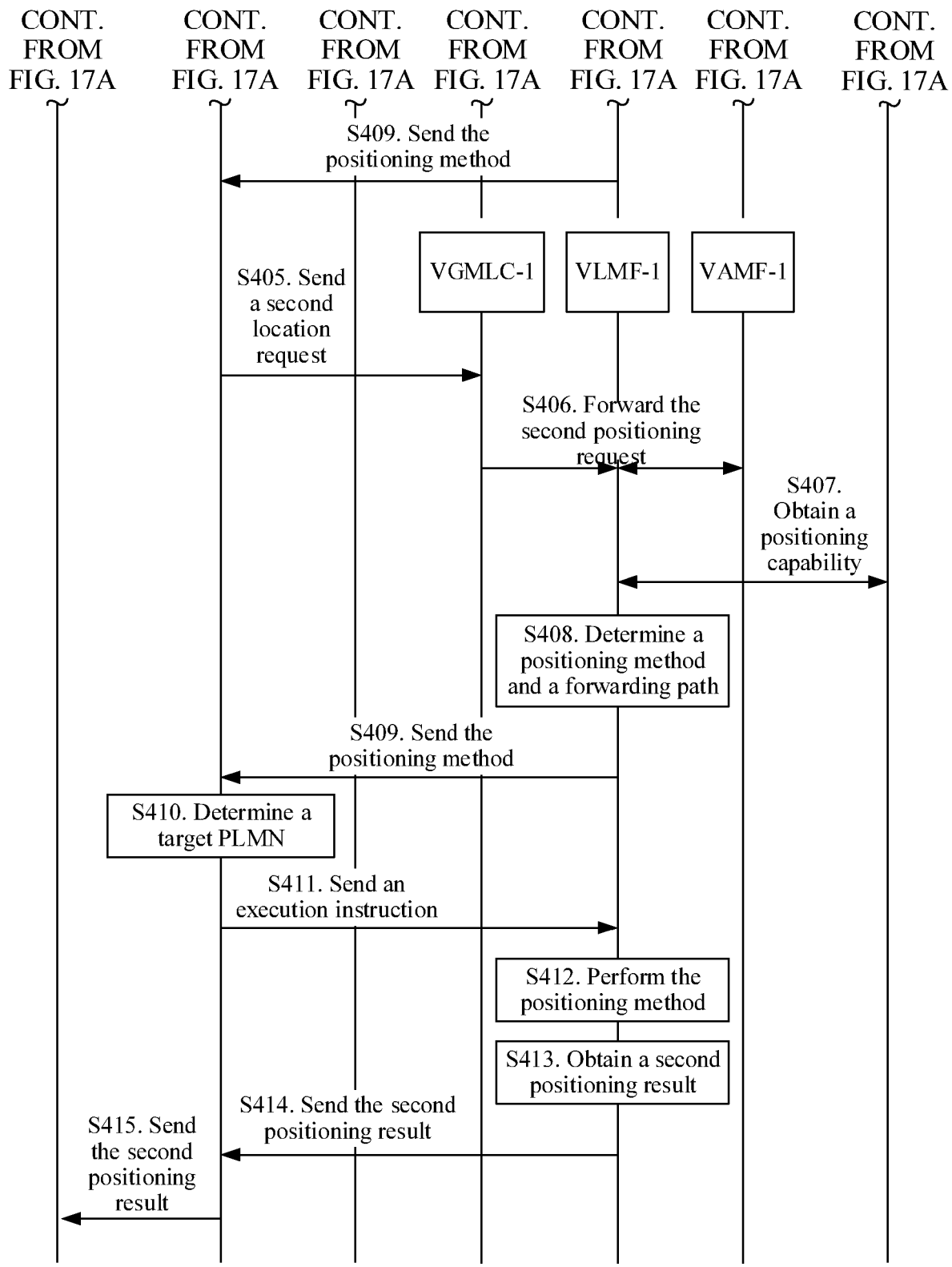

FIG. 17A and FIG. 17B are schematic flowcharts of a positioning method 400 according to another embodiment of this application.

As shown in FIG. 17A and FIG. 17B, the method 400 includes the following steps.

S401. An external LCS client sends a first positioning request for positioning a terminal device to a mobile location center gateway (an HGMLC in an HPLMN), where the first positioning request includes an identifier of the terminal device, for example, a GPSI or an SUPI of a target terminal device; the HGMLC first determines a privacy setting of the target terminal device and whether the LCS client has permission to position the terminal device. The privacy setting of the terminal device may be obtained from a UDM in the HPLMN based on the identifier of the terminal device, or the privacy setting of the terminal device is already cached or preconfigured in the HGMLC. The positioning permission of the LCS client is preconfigured in the HGMLC.

S402. The HGMLC obtains, from the UDM based on identifier information (a GPSI, an SUPI, or the like) of the terminal device and using a service-based interface (for example, Nudm_UE Context Management_Get), information required for positioning, for example, information such as an address of a serving AMF (VAMF), an address of a serving LMF (VLMF), or an address of a serving GMLC (VGMLC).

S403. For each access technology type of the terminal device, the UDM feeds back the address of the VAMF. In addition, the UDM may also feed back the address of the VGMLC or the address of the VLMF. If the HGMLC needs to obtain an access type and/or a connection status (for example, the HGMLC needs to determine a target PLMN based on a priority configuration of an access type and/or a priority configuration of a connection status, or the HGMLC needs to transmit the information), the UDM simultaneously feeds back the access type and/or the connection status.

S404. When the HGMLC finds, based on a quantity of addresses of a network element, such as the VAMF, returned by the UDM, that the terminal device accesses different PLMNs, the HGMLC may determine to send a second positioning request to the plurality of VPLMNs. Alternatively, the HGMLC sends the second positioning request to some PLMNs in the plurality of VPLMNs. Sending the second positioning request to two VPLMNs (VPLMN-1 and VPLMN-2) is shown in FIG. 16A and FIG. 16B. The second positioning request carries the instruction information, to instruct the VPLMN-1 and the VPLMN-2 to separately determine the positioning method.

S405. The HGMLC sends the second positioning request to a VGMLC-1 in the VPLMN-1 and a VGMLC-2 in the VPLMN-2 respectively. The second positioning request may include information such as the access type and/or the connection status, or may include information an address of a VAMF-1 and an address of a VLMF-1 in the VPLMN-1, an address of a VAMF-2 and an address of a VLMF-2 in the VPLMN-2, and the identifier of the terminal device.

S406. The VGMLC-1 and the VGMLC-2 respectively further forward the second positioning request to the VLMF-1 network element and the VLMF-2 network element.

S407. If the VLMF-1 and/or the VLMF-2 do/does not obtain the positioning capability supported by the terminal device, the VLMF-1 and/or the VLMF-2 need/needs to first interact with the terminal device to obtain the positioning capability supported by the terminal device. The positioning capability mainly includes: a positioning method supported by the terminal device, a positioning device (for example, whether a global positioning system (GPS) module is included) supported by the terminal device, and the like.

S408. The VLMF-1 and the VLMF-2 separately determine the positioning method and a forwarding path based on information such as the positioning capability supported by the terminal device, a positioning capability supported by a network (similar to the positioning capability supported by the terminal device), a positioning requirement and instruction information included in the second positioning request, the access technology type, and the connection status. After the positioning method is determined, the positioning method is not performed temporarily.

S409. The VLMF-1 and the VLMF-2 respectively return respective positioning methods to the VGMLC-1 and the VGMLC-2, and the VGMLC-1 and the VGMLC-2 separately return the positioning method to the HGMLC.

S410. The H-GMLC selects, based on the precision and the positioning method that is returned by the two PLMNs, a target PLMN (for example, the VPLMN-2) to perform positioning. If the first received positioning method meets the positioning requirement, an execution instruction is immediately sent to an LMF corresponding to the positioning method that meets the positioning requirement. The H-GMLC may explicitly send the execution instruction using the indication information. Optionally, the HGMLC may further explicitly send an instruction to another PLMN (the VPLMN-1) to cancel positioning. Alternatively, the two LMFs may determine, depending on whether a timer expires, whether to perform the positioning method.

S411. The H-GMLC sends an execution instruction to the VLMF-2.

S412. The VLMF-2 executes a positioning procedure based on the determined positioning method.

S413. The VLMF-2 obtains a second positioning result (a positioning result obtained by the VLMF-2).

S414. The VLMF-2 returns the second positioning result to the HGMLC.

S415. The HGMLC returns the second positioning result to the LCS client.

It should be understood that, in step S404, the H-GMLC may select, based on the priority configuration of the access technology type and/or the priority configuration of the connection status, a plurality of PLMNs for positioning. Alternatively, a plurality of PLMNs may be randomly selected for positioning. This is not limited in this application herein.

Figure 18A:
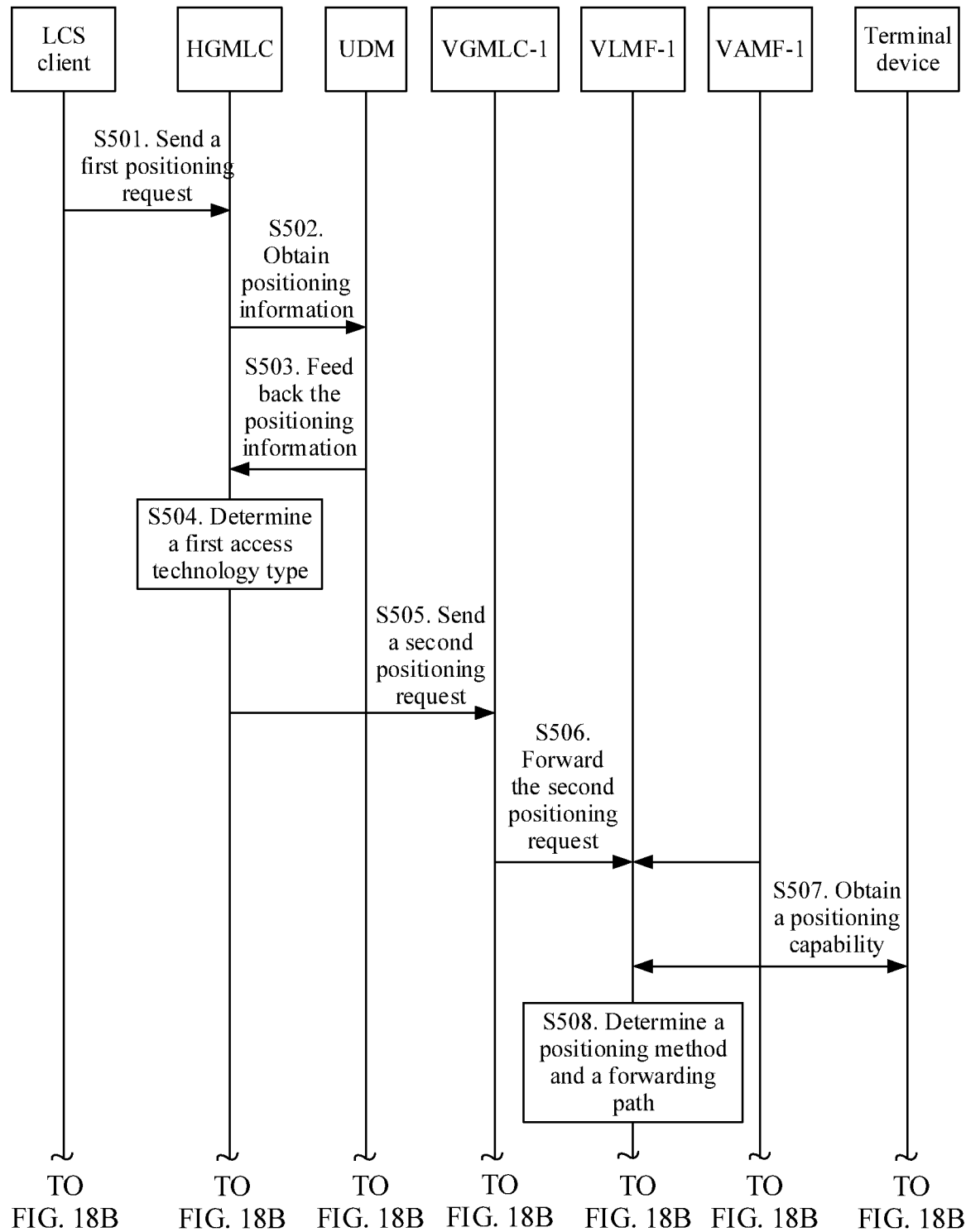
FIG. 18A and FIG. 18B are schematic interaction diagrams of a positioning method according to another embodiment of this application.
Figure 18B:
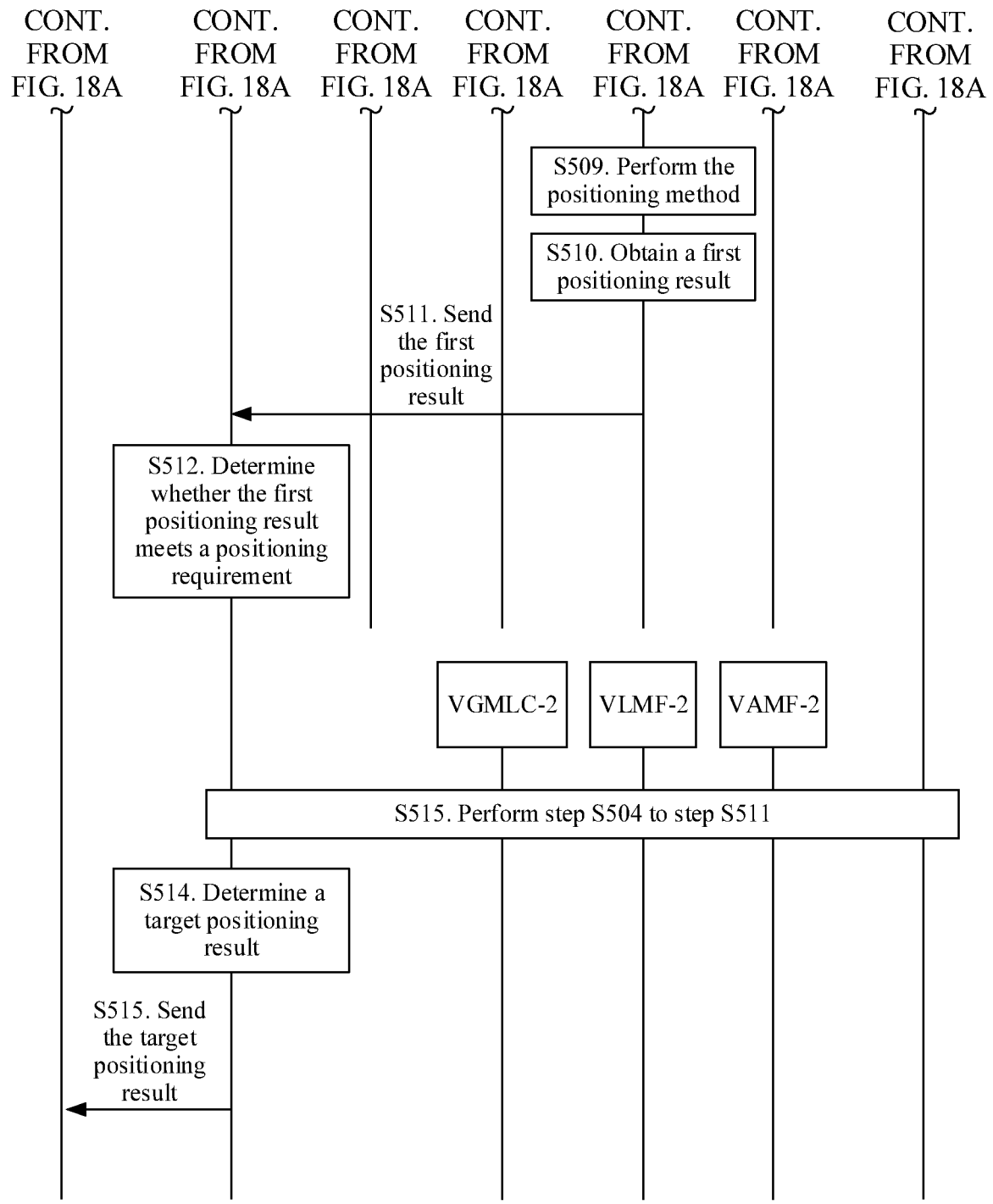

FIG. 18A and FIG. 18B are schematic flowcharts of a positioning method 500 according to an embodiment of this application.

As shown in FIG. 18A and FIG. 18B, the method 500 includes the following steps.

S501. An external LCS client sends a first positioning request for positioning a terminal device to a mobile location center gateway (an HGMLC in an HPLMN), where the first positioning request includes an identifier of the terminal device, for example, a GPSI or an SUPI of a target terminal device; the HGMLC first determines a privacy setting of the target terminal device and whether the LCS client has permission to position the terminal device. The privacy setting of the terminal device may be obtained from a UDM in the HPLMN based on the identifier of the terminal device, or the privacy setting of the terminal device is already cached or preconfigured in the HGMLC. The positioning permission of the LCS client is preconfigured in the HGMLC.

S502. The HGMLC obtains, from the UDM based on identifier information (a GPSI, an SUPI, or the like) of the terminal device and using a service-based interface (for example, Nudm_UE Context Management_Get), information required for positioning, for example, information such as an address of a serving AMF (VAMF), an address of a serving LMF (VLMF), or an address of a serving GMLC (VGMLC).

S503. For each access technology type of the terminal device, the UDM feeds back the address of the VAMF. The UDM may also feed back the address of the VGMLC or the address of the VLMF. If the HGMLC needs to obtain an access type and/or a connection status (for example, the HGMLC needs to determine a target PLMN based on a priority configuration of an access type and/or a priority configuration of a connection status, or the HGMLC needs to transmit the information), the UDM simultaneously feeds back the access type and/or the connection status.

S504. When the HGMLC finds, based on a quantity of addresses of a network element, such as the VAMF, returned by the UDM, that the terminal device accesses different PLMNs, the HGMLC selects, based on the priority configuration of the access technology type and/or the priority configuration of the connection status, an access technology type (a first access technology type) finally for positioning, and determines a VGMLC-1 in a PLMN (a first PLMN) based on the first access technology type.

S505. The HGMLC sends a second positioning request to the VGMLC-1, where the second positioning request includes the first access technology type, and optionally, may further include information, such as a connection status, and instruction information, where the instruction information is used to instruct a VLMF-1 in the first PLMN to directly use the first access technology type to determine the positioning method. Alternatively, the second positioning request may include information such as an address of a VAMF-1, an address of the VLMF-1, the identifier of the terminal device, and the positioning requirement.

S506. The VGMLC-1 further forwards the second positioning request to the VLMF-1 network element. According to different solutions, the VGMLC-1 may forward the second positioning request to the VLMF-1 indirectly using the VAMF-1, and finally, the VLMF-1 receives the second positioning request. Alternatively, the VGMLC-1 may directly send the second positioning request to the VLMF-1.

S507. If the VLMF-1 does not obtain the positioning capability supported by the terminal device, the VLMF-1 needs to first interact with the terminal device to obtain the positioning capability supported by the terminal device. The positioning capability mainly includes: a positioning method supported by the terminal device, a positioning device (for example, whether a global positioning system (GPS) module is included) supported by the terminal device, and the like.

S508. When the VLMF-1 determines the access technology type, the VLMF-1 may determine the positioning method and a forwarding path based on information such as the positioning capability supported by the terminal device, a positioning capability supported by a network (similar to the positioning capability supported by the terminal device), a positioning requirement included in the second positioning request, the access technology type, and the connection status.

Alternatively, the VLMF-1 may determine the positioning method based on the instruction information in the second positioning request and the first access technology type determined by the HGMLC.

Alternatively, if the VLMF-1 receives a single access technology type from the HGMLC, the VLMF-1 determines the positioning method based on, by default, the first access technology type determined by the HGMLC.

S509. The VLMF-1 performs the positioning method.

S510. The VLMF-1 obtains a first positioning result.

S511. The VLMF-1 returns the first positioning result to the VGMLC-1. The VGMLC-1 finally returns the first positioning result to the HGMLC.

S512. After receiving the first positioning result, the HGMLC determines, based on the positioning precision and the indication information indicating whether positioning succeeds that is included in the first positioning result, whether the first positioning result meets a positioning requirement. The positioning requirement mainly includes precision, a delay, and the like. Processing varies with the first positioning result as follows.

(a) If the positioning succeeds, and the precision meets a requirement, the first positioning result is returned to the LCS client, and the positioning ends.

(b) If the positioning succeeds, but the precision does not meet the requirement, S313 is performed.

(c) If the positioning fails, S313 is performed.

S513. The HGMLC determines a second target PLMN, forwards the positioning request to the second target PLMN, and receives a second positioning result from a VLMF-2. That is, for the second target PLMN, step 504 to step S511 are performed.

S514. The HGMLC compares the first positioning result and the second positioning result (a positioning result determined by the second target PLMN). A target positioning result with higher precision is determined. If neither the first positioning result nor the second positioning result meets the positioning requirement, the first positioning result and the second positioning result are used as the target positioning result.

S515. The HGMLC feeds back a target positioning result to the LCS client.

It should be understood that the procedures described in the method 300 to the method 500 are merely used to describe, using examples, the positioning method provided in this application, and should not constitute any limitation on the positioning method provided in this application. For example, there may be a plurality of VPLMNs of the terminal device. This is not limited in this embodiment of this application.

It should be further understood that division of manners, cases, types, and embodiments in embodiments of this application are for ease of description, but should not constitute any special limitation, and features in various manners, types, cases, and embodiments may be combined when there is no contradiction.

It should be further understood that in the embodiments of this application, "first", "second", and the like are merely used to indicate that a plurality of objects are different. For example, the first positioning request and the second positioning request are merely used to represent different positioning requests. This should not have any impact on the positioning request, and the foregoing "first" and "second" should not constitute any limitation on the embodiments of this application.

It should be further understood that the foregoing descriptions are intended to help a person skilled in the art better understand the embodiments of this application, but are not intended to limit the scope of the embodiments of this application. A person skilled in the art may make various equivalent modifications or changes according to the examples provided above. For example, some steps in the method 100 to the method 500 may be unnecessary, or some steps may be newly added. Alternatively, any two or more of the foregoing embodiments are combined. Such modified, changed, or combined solutions also fall within the scope of the embodiments of this application.

It should be further understood that, the foregoing descriptions of the embodiments of this application focus on differences between the embodiments. For same or similar parts that are not mentioned, reference may be made to each other. For brevity, details are not described herein again.

It should be further understood that, sequence numbers of the foregoing processes do not indicate an execution sequence. The execution sequence of the processes should be determined according to functions and internal logic of the processes, and should not constitute any limitation on the implementation processes of the embodiments of this application.

It should be further understood that in the embodiments of this application, "preset" and "predefined" may be implemented in a manner in which corresponding code, a table, or other related indication information is prestored in a device (for example, including a terminal device and a network device). A specific implementation of the foregoing "preset" and "predefined" is not limited in this application.

It should be further understood that, in the embodiments of this application, unless otherwise stated or there is a logic conflict, terms and/or descriptions between different embodiments are consistent and may be mutually referenced, and technical features in different embodiments may be combined according to an internal logical relationship thereof, to form a new embodiment.

With reference to FIG. 1 to FIG. 18B, the foregoing describes in detail the positioning methods in the embodiments of this application. With reference to FIG. 19 to FIG. 24, the following describes in detail communications apparatuses in the embodiments of this application.

Figure 19:
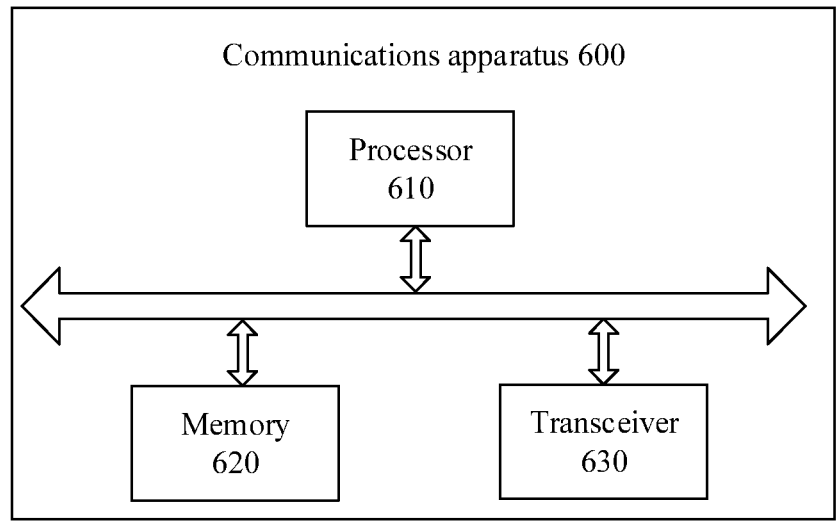
FIG. 19 is a schematic block diagram of a communications apparatus according to an embodiment of this application.

FIG. 19 is a schematic block diagram of a communications apparatus according to an embodiment of this application. It should be understood that the communications apparatus may refer to the foregoing mobile location center gateway. For example, the communications apparatus may be a GMLC or an NEF. The communications apparatus 600 shown in FIG. 19 may be configured to perform steps performed by the mobile location center gateway in the method 100 and the method 300 to the method 500 in FIG. 5 to FIG. 11 and FIG. 16A to FIG. 18B. The communications apparatus embodiment corresponds to the method embodiments. For similar descriptions, refer to the method embodiments. The communications apparatus 600 includes a processor 610 and a transceiver 630. Optionally, the apparatus may further include a memory 620. The processor 610, the memory 620, and the transceiver 630 are connected through communication. The memory 620 stores an instruction. The processor 610 is configured to execute the instruction stored in the memory 620. The transceiver 630 is configured to send or receive a specific signal as driven by the processor 610.

The transceiver 630 is configured to receive a first positioning request for positioning a terminal device from a location service client.

The processor 610 is configured to determine a first target PLMN based on the first positioning request, where the first target PLMN is for providing a location service for the terminal device.

The transceiver 610 is further configured to send a second positioning request to a first LMF network element in the first target PLMN, where the second positioning request requests the first LMF to provide a location service for the terminal device.

With the communications apparatus provided in this application, in a scenario in which the terminal device accesses a plurality of PLMNs, the terminal device can be positioned in a multi-PLMN scenario. This clarifies a terminal device positioning technology in the multi-PLMN scenario, improves efficiency and accuracy of terminal device positioning, and improves communication efficiency and user experience.

Optionally, in another embodiment of this application, the processor 610 is configured to: determine, based on the first positioning request, a plurality of PLMNs that the terminal device accesses; and determine the first target PLMN in the plurality of PLMNs.

Optionally, in another embodiment of this application, the processor 610 is configured to: determine the first target PLMN in the plurality of PLMNs based on one or more of configuration information of the terminal device, information about an access technology type of the terminal device, or information about a connection status corresponding to the access technology type of the terminal device.

Optionally, in another embodiment of this application, the transceiver 630 is further configured to: receive a first positioning result of the terminal device from the first LMF; send a third positioning request to a second LMF in a second target PLMN when the first positioning result does not meet a positioning requirement, where the third positioning request requests the second LMF in the second target PLMN to provide a location service for the terminal device; and receive a second positioning result of the terminal device from the second LMF.

Optionally, in another embodiment of this application, the processor 610 is further configured to: determine a target positioning result of the terminal device based on the first positioning result and the second positioning result. Additionally, the transceiver is further configured to send the target positioning result to the location service client.

Optionally, in another embodiment of this application, the processor 610 is configured to: determine, based on the first positioning request, a plurality of PLMNs that the terminal device accesses. The transceiver 630 is further configured to: send first instruction information to LMFs in the plurality of PLMNs, where the first instruction information is used to instruct the LMFs in the plurality of PLMNs to determine a positioning method; and receive the positioning method from the LMFs in the plurality of PLMNs. Additionally, the processor 610 is further configured to determine the first target PLMN based on the received positioning method.

Optionally, in another embodiment of this application, the processor 610 is configured to: determine a first positioning method based on positioning precision of the positioning method; and determine the first target PLMN based on the first positioning method.

Optionally, in another embodiment of this application, the processor 610 is configured to: determine, based on a quantity of addresses of a serving LMF of the terminal device, a quantity of addresses of a serving access and mobility management gateway AMF of the terminal device, or a quantity of addresses of a serving GMLC of the terminal device, the plurality of PLMNs that the terminal device accesses.

Optionally, in another embodiment of this application, the transceiver 630 is further configured to: receive at least one of address information of the serving AMF, address information of the serving LMF, or address information of the serving GMLC from a unified management network element, where the terminal device accesses the serving AMF, the serving LMF and the serving GMLC.

Optionally, in another embodiment of this application, the transceiver 630 is further configured to: receive the information about the access technology type and/or the information about the connection status corresponding to the access technology type of the terminal device from the unified management network element.

Optionally, in another embodiment of this application, the mobile location center gateway is a GMLC of a HPLMN of the terminal device, and the first target PLMN is a VPLMN of the terminal device, or the first target PLMN is a HPLMN of the terminal device.

Optionally, in another embodiment of this application, the second positioning request further includes at least one of the information about the access technology type corresponding to the first target PLMN, the information about the connection status corresponding to the access technology type, or the configuration information.

Figure 20:
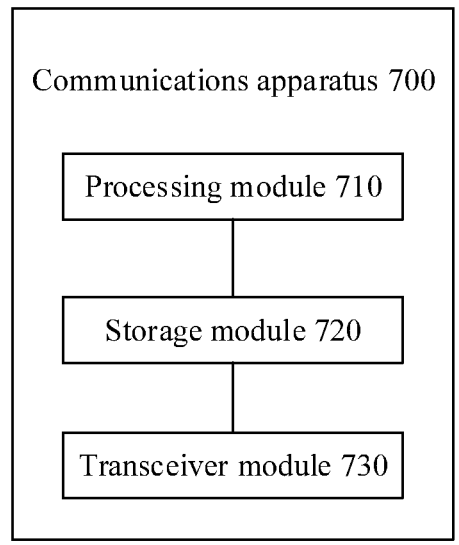
FIG. 20 is a schematic block diagram of a communications apparatus according to another embodiment of this application.

It should be noted that in this embodiment of this application, the processor 610 may be implemented by a processing module, the memory 620 may be implemented by a storage module, and the transceiver 630 may be implemented by a transceiver module. As shown in FIG. 20, a communications apparatus 700 may include a processing module 710, a storage module 720, and a transceiver module 730.

The communications apparatus 600 shown in FIG. 19 or the communications apparatus 700 shown in FIG. 20 can implement the steps performed by the mobile location center gateway in the method 100, and the method 300 to the method 500 in FIG. 5 to FIG. 11, and FIG. 16A to FIG. 18B. For similar descriptions, refer to the descriptions in the foregoing corresponding methods. To avoid repetition, details are not described herein again.

Figure 21:
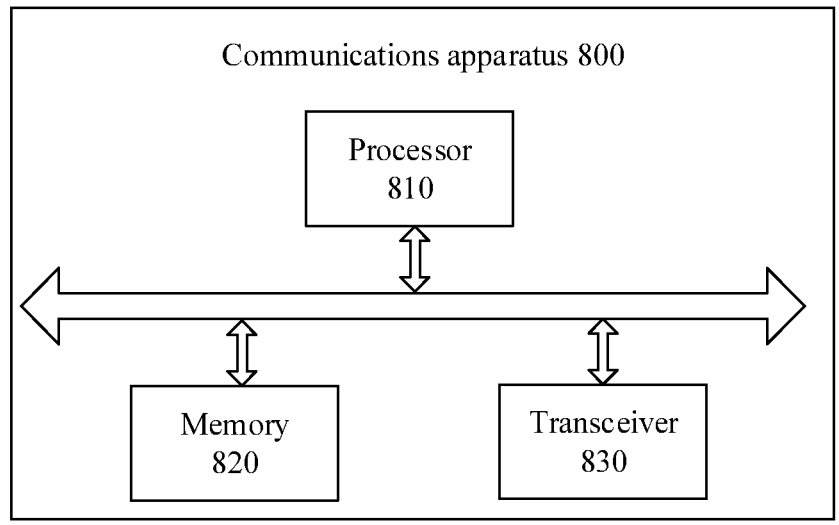
FIG. 21 is a schematic block diagram of a communications apparatus according to an embodiment of this application.

FIG. 21 is a schematic block diagram of a communications apparatus according to an embodiment of this application. It should be understood that, the communications apparatus may be the foregoing LMF, and the communications apparatus 700 shown in FIG. 21 may be configured to perform steps that are performed by the first LMF or the second LMF in the method 100 and the method 100 to the method 500 corresponding to FIG. 5 to FIG. 18B. The communications apparatus embodiment corresponds to the method embodiments. For similar descriptions, refer to the method embodiments. The communications apparatus 800 includes a processor 810 and a transceiver 830. Optionally, the apparatus may further include a memory 820. The processor 810, the memory 820, and the transceiver 830 are connected through communication. The memory 820 stores an instruction. The processor 810 is configured to execute the instruction stored in the memory 820. The transceiver 830 is configured to send or receive a specific signal as driven by the processor 810.

The transceiver 830 is configured to receive a second positioning request from a GMLC, where the LMF is configured to provide a location service for the terminal device.

The processor 810 is configured to determine a positioning method based on the second positioning request.

With the communications apparatus provided in this application, the terminal device can be positioned in the multi-PLMN scenario, thereby improving efficiency and accuracy of terminal device positioning, and improving communication efficiency and user experience.

Optionally, in another embodiment of this application, the transceiver 830 is further configured to: send the positioning method to the GMLC; and receive second instruction information from the GMLC, where the second instruction information is used to instruct the LMF to perform the positioning method or not to perform the positioning method.

Optionally, in another embodiment of this application, when the second instruction information instructs the LMF to perform the positioning method, the processor 810 is further configured to: determine a positioning result of the terminal device based on the positioning method. Additionally, the transceiver 830 is further configured to send the positioning result to the GMLC.

Optionally, in another embodiment of this application, the second positioning request further includes configuration information of the terminal device, and the processor 810 is configured to: determine an access technology type of the terminal device based on the configuration information and information about the access technology type; and determine the positioning method based on the access technology type.

Optionally, in another embodiment of this application, the processor 810 is configured to: determine the positioning method based on the access technology type.

Optionally, in another embodiment of this application, the second positioning request further includes third instruction information, and the third instruction information is used to instruct the LMF to determine the positioning method based on the access technology type.

Optionally, in another embodiment of this application, the second positioning request further includes information about a connection status and/or the information about the access technology type of the terminal device.

Figure 22:
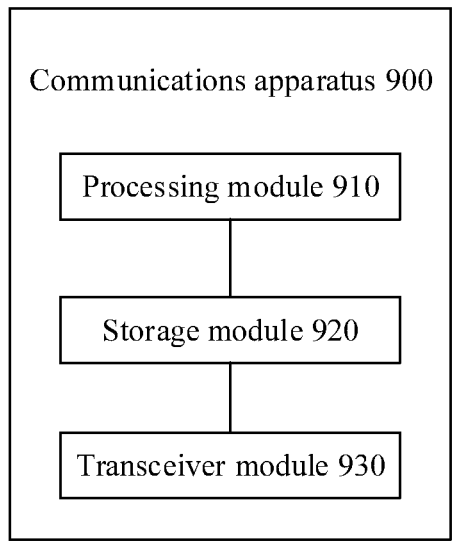
FIG. 22 is a schematic block diagram of a communications apparatus according to another embodiment of this application.

It should be noted that in this embodiment of this application, the processor 810 may be implemented by a processing module, the memory 820 may be implemented by a storage module, and the transceiver 830 may be implemented by a transceiver module. As shown in FIG. 22, a communications apparatus 900 may include a processing module 910, a storage module 920, and a transceiver module 930.

The communications apparatus 800 shown in FIG. 21 or the communications apparatus 900 shown in FIG. 22 can implement the steps performed by the first LMF or the second LMF in the method 100 to the method 500 in FIG. 5 to FIG. 18B. For similar descriptions, refer to the descriptions in the foregoing corresponding methods. To avoid repetition, details are not described herein again.

Figure 23:
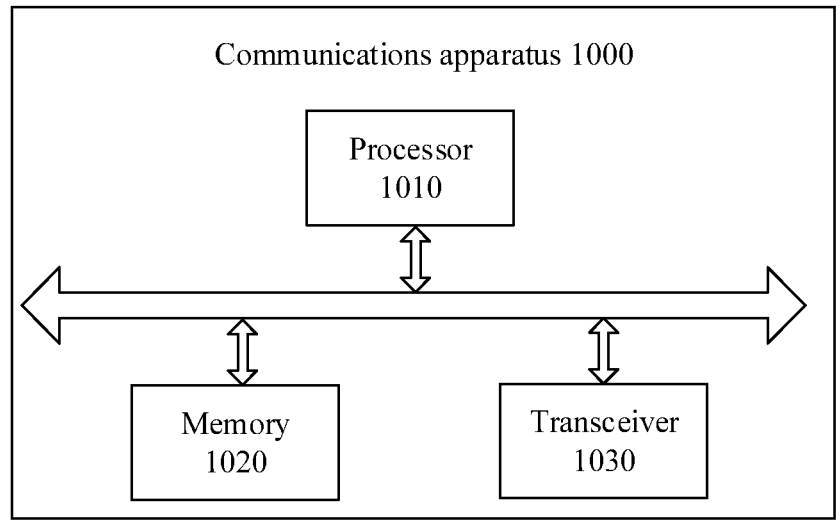
FIG. 23 is a schematic block diagram of a communications apparatus according to an embodiment of this application.

FIG. 23 is a schematic block diagram of a communications apparatus according to an embodiment of this application. It should be understood that, the communications apparatus may refer to the foregoing mobile location center gateway, and the communications apparatus 1000 shown in FIG. 23 may be configured to perform steps performed by the mobile location center gateway in FIG. 12 to FIG. 15. The communications apparatus embodiment corresponds to the method embodiments. For similar descriptions, refer to the method embodiments. The communications apparatus 1000 includes a processor 1010 and a transceiver 1030. Optionally, the apparatus may further include a memory 1020. The processor 1010, the memory 1020, and the transceiver 1030 are connected through communication. The memory 1020 stores an instruction. The processor 1010 is configured to execute the instruction stored in the memory 1020. The transceiver 1030 is configured to send or receive a specific signal as driven by the processor 1010.

The transceiver 1030 is configured to receive a fourth positioning request for positioning a terminal device from a location service client.

The processor 1010 is configured to determine a first access technology type of the terminal device based on the fourth positioning request.

The mobile location center gateway sends, based on the first access type, a fifth positioning request to a first LMF corresponding to the first access type, where the fifth positioning request requests the first LMF to provide a location service for the terminal device.

With the communications apparatus provided in this embodiment of this application, in a scenario in which the terminal device accesses a plurality of LMFs, an LMF that provides a service for the terminal device may be determined based on the access technology type, such that the terminal device can be positioned in an LMF scenario. This clarifies a terminal device positioning technology in the multi-LMF scenario, and improves communication efficiency and user experience.

Optionally, in another embodiment of this application, the processor 1010 is configured to: determine the first access technology type based on configuration information of the terminal device, information about an access technology type of the terminal device, and information about a connection status corresponding to the access technology type.

Optionally, in another embodiment of this application, the processor 1010 is further configured to: receive a first positioning result of the terminal device from the first LMF. When the first positioning result does not meet a positioning requirement, the transceiver 1030 is further configured to: send a fifth positioning request to a second LMF corresponding to a second access type, where the fifth positioning request requests the second LMF to provide a location service for the terminal device; and receive a second positioning result of the terminal device from the second LMF.

Optionally, in another embodiment of this application, the processor 1010 is further configured to: determine a target positioning result of the terminal device based on the first positioning result and the second positioning result. Additionally, the transceiver 1030 is further configured to send the target positioning result to the location service client.

Optionally, in another embodiment of this application, the transceiver 1030 is further configured to: receive at least one of address information of a serving AMF, address information of a serving LMF, or address information of a serving GMLC from a unified management network element, where the terminal device accesses the serving AMF, the serving LMF and the serving GMLC.

Optionally, in another embodiment of this application, the transceiver 1030 is further configured to: receive at least one of the configuration information, the information about the access technology type, or the information about the connection status corresponding to the access technology type that are from the unified management network element.

Figure 24:
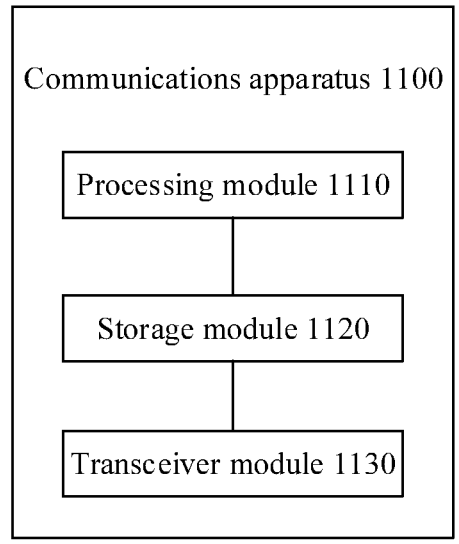
FIG. 24 is a schematic block diagram of a communications apparatus according to another embodiment of this application.

It should be noted that in this embodiment of this application, the processor 1010 may be implemented by a processing module, the memory 1020 may be implemented by a storage module, and the transceiver 1030 may be implemented by a transceiver module. As shown in FIG. 24, a communications apparatus 1100 may include a processing module 1110, a storage module 1120, and a transceiver module 1130.

The communications apparatus 1000 shown in FIG. 23 or the communications apparatus 1100 shown in FIG. 24 can implement the steps performed by the mobile location center gateway in FIG. 12 to FIG. 15. For similar descriptions, refer to the descriptions in the foregoing corresponding methods. To avoid repetition, details are not described herein again.

In the apparatuses shown in FIG. 19 to FIG. 24, components in each communications apparatus are connected through communication, to be more specific, the processor (or the processing module), the memory (or the storage module), and the transceiver (the transceiver module) communicate with each other using an internal connection path, to transfer a control and/or data signal. The foregoing method embodiments of this application may be applied to the processor, or the processor implements the steps of the foregoing method embodiments. The processor may be an integrated circuit chip and has a signal processing capability.

In an implementation process, steps in the foregoing method embodiments can be completed using a hardware integrated logical circuit in the processor, or using an instruction in a form of software. The processor may be a central processing unit (CPU), a network processor (NP), a combination of a CPU and an NP, a digital signal processor (DSP), an application-specific integrated circuit (ASIC), or a field programmable gate array (FPGA) or another programmable logic device, a discrete gate or a transistor logic device, or a discrete hardware component. The processor may implement or perform the methods, the steps, and logical block diagrams that are disclosed in this application. The general-purpose processor may be a microprocessor, or the processor may be any conventional processor or the like. Steps of the methods disclosed in this application may be directly executed and completed using a hardware decoding processor, or may be executed and completed using a combination of hardware and software modules in the decoding processor. The software module may be located in a mature storage medium in the art, such as a random-access memory (RAM), a flash memory, a read-only memory (ROM), a programmable read-only memory, an electrically erasable programmable memory, or a register. The storage medium is located in a memory, and the processor reads information in the memory and completes the steps in the foregoing methods in combination with hardware of the processor. Although only one processor is shown in the figure, the apparatus may include a plurality of processors, or the processor includes a plurality of processing units. For example, the processor may be a single-core (single-CPU) processor, or may be a multi-core (multi-CPU) processor.

The memory is configured to store a computer instruction executed by the processor. The memory may be a storage circuit or a memory. The memory may be a volatile memory or a non-volatile memory, or may include both a volatile memory and a non-volatile memory. The non-volatile memory may be an ROM, a programmable read-only memory (PROM), an erasable programmable read-only memory (EPROM), an electrically erasable programmable read-only memory (EEPROM), or a flash memory. The volatile memory may be an RAM, and the volatile memory is used as an external cache. The memory may be independent of the processor, or may be a storage unit in the processor. This is not limited herein. Although only one memory is shown in the figure, the apparatus may include a plurality of memories, or the memory includes a plurality of storage units.

The transceiver is configured to implement content exchange between the processor and another unit or network element. For example, the transceiver may be a communications interface of the apparatus, or may be a transceiver circuit or a communications unit, or may be a transceiver. The transceiver may alternatively be a communications interface or a transceiver circuit of the processor. Optionally, the transceiver may be a transceiver chip. The transceiver may further include a sending unit and/or a receiving unit. In a possible implementation, the transceiver may include at least one communications interface. In another possible implementation, the transceiver may alternatively be a unit implemented in a form of software. In the embodiments of this application, the processor may interact with another unit or network element through the transceiver. For example, the processor obtains or receives content from another network element through the transceiver. If the processor and the transceiver are two physically separated components, the processor may exchange content with another unit in the apparatus without using the transceiver.

In a possible implementation, the processor, the memory, and the transceiver may be connected to each other using a bus. The bus may be a peripheral component interconnect (PCI) bus, an Extended Industry Standard Architecture (EISA) bus, or the like. The bus may be classified into an address bus, a data bus, a control bus, and the like.

An embodiment of this application further provides an apparatus. The apparatus can perform the positioning method according to any one of the foregoing embodiments. In the apparatus provided in the embodiments of this application, in a scenario in which the terminal device accesses a plurality of PLMNs, the terminal device can be positioned in a multi-PLMN scenario. This clarifies a terminal device positioning technology in the multi-PLMN scenario, improves efficiency and accuracy of terminal device positioning, and improves communication efficiency and user experience.

An embodiment of this application further provides a computer-readable medium, configured to store code of a computer program. The computer program includes an instruction used to perform the positioning method in the embodiments of this application in the foregoing methods 100 to 500. The readable medium may be an ROM or an RAM. This is not limited in this embodiment of this application.

This application further provides a computer program product. The computer program product includes an instruction. When the instruction is executed, the mobile location center gateway, the location management gateway, the session management function gateway, the UDM gateway, the terminal device, and the like are enabled to perform corresponding operations in the positioning methods provided in this application.

An embodiment of this application further provides a communications system. The communications system includes the communications apparatus provided in the foregoing embodiments of this application, and the communications system can implement any positioning method provided in the embodiments of this application.

An embodiment of this application further provides a system chip. The system chip includes a processing unit and a communications unit. The processing unit may be, for example, a processor, and the communications unit may be, for example, an input/output interface, a pin, or a circuit. The processing unit is capable of executing a computer instruction, such that the chip in the communications apparatus performs any positioning method provided in the foregoing embodiments of this application.

Optionally, the computer instruction is stored in a storage unit.

Optionally, the storage unit is a storage unit inside the chip, such as a register or a cache. Alternatively, the storage unit may be a storage unit that is inside the terminal and that is located outside the chip, such as an ROM, another type of static storage device that can store static information and instructions, or an RAM. Any processor mentioned above may be a CPU, a microprocessor, an ASIC, or one or more integrated circuits for controlling program execution of the foregoing positioning method.

In addition, aspects or features of this application may be implemented as a method, an apparatus or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk or a magnetic tape), an optical disc (for example, a compact disc (CD), a digital versatile disc (DVD), a smart card and a flash memory component (for example, erasable programmable read-only memory (EPROM), a card, a stick, or a key drive). In addition, various storage media described in this specification may represent one or more devices and/or other machine-readable media that are configured to store information. The term "machine-readable media" may include but are not limited to a radio channel and various other media that can store, include, and/or carry an instruction and/or data.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of technical solutions. A person skilled in the art may use a different method to implement the described functions for each particular application, but it should not be considered that the implementation goes beyond the scope of this application.

It may be understood by a person skilled in the art that, for the purpose of convenient and brief description, for a detailed working process of the foregoing system, apparatus, and units, refer to a corresponding process in the foregoing method embodiments, and details are not described herein again.

In the several embodiments provided in this application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, for example, a Universal Serial Bus (USB) flash drive, a removable hard disk, an ROM, an RAM, a magnetic disk, or a compact disc.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A positioning method comprising:
receiving, by a mobile location center gateway and from a location service client, a first positioning request for positioning a terminal device;
determining, by the mobile location center gateway based on the first positioning request, a plurality of public land mobile networks (PLMNs) that the terminal device accesses;
determining, by the mobile location center gateway, a first target PLMN in the plurality of PLMNs based on information about a connection status that is of the terminal device and that corresponds to an access technology type of the terminal device, wherein the first target PLMN is for providing a location service for the terminal device;
sending, by the mobile location center gateway and to a first location management function (LMF) in the first target PLMN, a second positioning request, wherein the second positioning request requesting the first LMF to provide the location service for the terminal device;
receiving, by the mobile location center gateway and from the first LMF, a first positioning result of the terminal device;
sending, by the mobile location center gateway and to a second LMF in a second target PLMN when the first positioning result does not meet a positioning requirement, a third positioning request requesting the second LMF in the second target PLMN to provide the location service for the terminal device, wherein the second target PLMN is in the plurality of PLMNs; and
receiving, by the mobile location center gateway and from the second LME, a second positioning result of the terminal device.

2. The positioning method according to claim 1, wherein the mobile location center gateway is a gateway mobile location center (GMLC) of a home PLMN (HPLMN) of the terminal device, and wherein the first target PLMN is one of a visited PLMN (VPLMN) of the terminal device or the HPLMN of the terminal device.

3. The positioning method according to claim 1, wherein the second positioning request comprises at least one of information about an access technology type corresponding to the first target PLMN, information about a connection status corresponding to the access technology type corresponding to the first target PLMN, or configuration information.

4. The positioning method according to claim 1, wherein determining, by the mobile location center gateway based on the first positioning request, the plurality of PLMNs comprises determining, by the mobile location center gateway, the plurality of PLMNs based on one of a quantity of addresses of a serving access and mobility management function (AMF) of the terminal device or a quantity of addresses of a serving gateway mobile location center (GMLC) of the terminal device.

5. The positioning method according to claim 4, further comprising receiving, by the mobile location center gateway and from a unified management network element, at least one of address information of the serving AMF or address information of the serving GMLC.

6. The positioning method according to claim 1, further comprising receiving, by the mobile location center gateway and from a unified management network element, the information about the connection status.

7. The positioning method according to claim 1, wherein the access technology type comprises a 3rd Generation Partnership Project (3GPP) access technology or a non-3GPP (N3GPP) access technology.

8. The positioning method according to claim 1, further comprising:
determining, by the mobile location center gateway, a target positioning result of the terminal device based on the first positioning result and the second positioning result; and
sending, by the mobile location center gateway and to the location service client, the target positioning result.

9. A system comprising:
a location service client configured to send a first positioning request for positioning a terminal device; and
a mobile location center gateway configured to:
receive the first positioning request from the location service client;
determine, based on the first positioning request, a plurality of public land mobile networks (PLMNs) that the terminal device accesses;
determine a first target PLMN in the plurality of PLMNs based on information about a connection status that is of the terminal device and that corresponds to an access technology type of the terminal device, wherein the first target PLMN is for providing a location service for the terminal device;
send a second positioning request to a first location management function (LMF) in the first target PLMN, wherein the second positioning request requests the first LMF to provide the location service for the terminal device;
receive a first positioning result of the terminal device from the first LMF;
send, to a second LMF in a second target PLMN when the first positioning result does not meet a positioning requirement, a third positioning request requesting the second LMF in the second target PLMN to provide the location service for the terminal device, wherein the second target PLMN is in the plurality of PLMNs; and
receive a second positioning result of the terminal device from the second LMF.

10. The system according to claim 9, wherein the mobile location center gateway is a gateway mobile location center (GMLC) of a home PLMN (HPLMN) of the terminal device, and wherein the first target PLMN is one of a visited PLMN (VPLMN) of the terminal device or the HPLMN of the terminal device.

11. The system according to claim 9, wherein the mobile location center gateway is further configured to further determine the plurality of PLMNs based on one of a quantity of addresses of a serving access and mobility management function (AMF) of the terminal device or a quantity of addresses of a serving gateway mobile location center (GMLC) of the terminal device.

12. The system according to claim 11, wherein the mobile location center gateway is further configured to receive at least one of address information of the serving AMF or address information of the serving GMLC from a unified management network element.

13. The system according to claim 9, wherein the mobile location center gateway is further configured to receive, from a unified management network element, the information about the connection status.

14. The system according to claim 9, wherein the access technology type comprises a 3rd Generation Partnership Project (3GPP) access technology or a non-3GPP (N3GPP) access technology.

15. The system according to claim 9, wherein the mobile location center gateway is further configured to:
  determine a target positioning result of the terminal device based on the first positioning result and the second positioning result; and
  send the target positioning result to the location service client.

16. An apparatus comprising:
  a memory configured to store a program; and
  one or more processors coupled to the memory and configured to execute the program to cause the apparatus to:
    receive a first positioning request for positioning a terminal device from a location service client;
    determine, based on the first positioning request, a plurality of public land mobile networks (PLMNs) that the terminal device accesses;
    determine a first target PLMN in the plurality of PLMNs based on information about a connection status that is of the terminal device and that corresponds to an access technology type of the terminal device, wherein the first target PLMN is for providing a location service for the terminal device;
    send a second positioning request to a first location management function (LMF) in the first target PLMN, wherein the second positioning request requests the first LMF to provide the location service for the terminal device;
    receive a first positioning result of the terminal device from the first LMF;
    send, to a second LMF in a second target PLMN when the first positioning result does not meet a positioning requirement, a third positioning request requesting the second LMF in the second target PLMN to provide the location service for the terminal device, wherein the second target PLMN is in the plurality of PLMNs; and
    receive a second positioning result of the terminal device from the second LMF.

17. The apparatus according to claim 16, wherein the one or more processors are further configured to execute the program to cause the apparatus to:
    determine a target positioning result of the terminal device based on the first positioning result and the second positioning result; and
    send the target positioning result to the location service client.

18. The apparatus according to claim 16, wherein the one or more processors are further configured to execute the program to cause the apparatus to further determine the first target PLMN in the plurality of PLMNs based on information about the access technology type or based on configuration information pre-stored in the apparatus, and wherein the configuration information comprises priority configuration information of the access technology type, of the connection status, or of the plurality of PLMNs.

19. The positioning method according to claim 1, further comprising further determining, by the mobile location center gateway, the first target PLMN in the plurality of PLMNs based on information about the access technology type based on configuration information pre-stored in the mobile location center gateway, wherein the configuration information comprises priority configuration information of the access technology type, of the connection status, or of the plurality of PLMNs.

20. The system according to claim 9, wherein the mobile location center gateway is further configured to further determine the first target PLMN in the plurality of PLMNs based on information about the access technology type based on configuration information pre-stored in the mobile location center gateway, and wherein the configuration information comprises priority configuration information of the access technology type, of the connection status, or of the plurality of PLMNs.

21. The system according to claim 9, wherein the second positioning request comprises at least one of information about an access technology type corresponding to the first target PLMN, information about a connection status corresponding to the access technology type corresponding to the first target PLMN, or configuration information.

22. The apparatus according to claim 16, wherein the apparatus is a gateway mobile location center (GMLC) of a home PLMN (HPLMN) of the terminal device, and wherein the first target PLMN is one of a visited PLMN (VPLMN) of the terminal device or the HPLMN of the terminal device.

23. The apparatus according to claim 16, wherein the second positioning request comprises at least one of information about an access technology type corresponding to the first target PLMN, information about a connection status corresponding to the access technology type corresponding to the first target PLMN, or configuration information.

* * * * *

UNITED STATES PATENT AND TRADEMARK OFFICE
CERTIFICATE OF CORRECTION

PATENT NO. : 12,323,940 B2
APPLICATION NO. : 17/166693
DATED : June 3, 2025
INVENTOR(S) : Haoren Zhu and Hualin Zhu It is certified that error appears in the above-identified patent and that said Letters Patent is hereby corrected as shown below:

In the Claims

Claim 1, Column 41, Line 44: "the second LME, a second" should read "the second LMF, a second"

Signed and Sealed this
Fifteenth Day of July, 2025

Coke Morgan Stewart
*Acting Director of the United States Patent and Trademark Office*